US011591070B2

(12) United States Patent
Huynh et al.

(10) Patent No.: US 11,591,070 B2
(45) Date of Patent: *Feb. 28, 2023

(54) METHODS AND APPARATUS FOR A DISTRIBUTED AIRCRAFT ACTUATION SYSTEM

(71) Applicant: The Boeing Company, Chicago, IL (US)

(72) Inventors: Neal Van Huynh, Bellevue, WA (US); Matthew Alexander Moser, Everett, WA (US); Patrick Joseph McCormick, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 518 days.

This patent is subject to a terminal disclaimer.

(21) Appl. No.: 16/658,359

(22) Filed: Oct. 21, 2019

(65) Prior Publication Data

US 2020/0047873 A1 Feb. 13, 2020

Related U.S. Application Data

(63) Continuation of application No. 15/653,257, filed on Jul. 18, 2017, now Pat. No. 10,450,055.
(Continued)

(51) Int. Cl.
*B64C 13/16* (2006.01)
*B64C 9/20* (2006.01)
(Continued)

(52) U.S. Cl.
CPC ............... *B64C 13/16* (2013.01); *B64C 9/20* (2013.01); *B64C 13/50* (2013.01); *B64C 5/02* (2013.01);
(Continued)

(58) Field of Classification Search
CPC combination set(s) only.
See application file for complete search history.

(56) References Cited

U.S. PATENT DOCUMENTS 9,073,643 B2 7/2015 Moy et al.
9,193,479 B2 11/2015 Moy et al.
(Continued)

FOREIGN PATENT DOCUMENTS

EP 1781538 A1 5/2007
EP 1785347 A2 5/2007
(Continued)

OTHER PUBLICATIONS

European Patent Office, "Communication pursuant to Article 94(3) EPC" issued in connection with European Appl. No. 18176849.0, dated Nov. 2, 2021, 6 pages.
(Continued)

*Primary Examiner* — Rachid Bendidi
(74) *Attorney, Agent, or Firm* — Hanley, Flight & Zimmerman, LLC

(57) ABSTRACT

Methods, apparatus, and articles of manufacture for a distributed aircraft actuation system are disclosed. An example apparatus includes a non-responsive component detector to determine a position difference between a first position of a first control surface of an aircraft and a second position of a second control surface of the aircraft, the first position lagging the second position, and a command generator, in response to determining that the position difference satisfies a threshold, the command generator is to cease movement of the second control surface at the second position, attempt to move the first control surface to the second position, and cease movement of the first control surface when moved to the second position.

28 Claims, 9 Drawing Sheets

Related U.S. Application Data

(60) Provisional application No. 62/520,288, filed on Jun. 15, 2017.

(51) Int. Cl.
| | |
|---|---|
| *B64C 13/50* | (2006.01) |
| *B64C 9/00* | (2006.01) |
| *B64D 45/00* | (2006.01) |
| *B64C 5/02* | (2006.01) |
| *B64C 5/06* | (2006.01) |

(52) U.S. Cl.
CPC ............... *B64C 5/06* (2013.01); *B64C 9/00* (2013.01); *B64C 2009/005* (2013.01); *B64D 2045/001* (2013.01)

(56) References Cited

U.S. PATENT DOCUMENTS

| | | | |
|---|---|---|---|
| 10,450,055 B2 | 10/2019 | Huynh et al. | |
| 2007/0108342 A1* | 5/2007 | Hanlon | B64C 13/505 244/99.2 |
| 2011/0255968 A1* | 10/2011 | Recksiek | B64D 45/0005 416/23 |
| 2017/0305530 A1 | 10/2017 | Finn et al. | |
| 2018/0362147 A1 | 12/2018 | Huynh et al. | |

FOREIGN PATENT DOCUMENTS

| | | |
|---|---|---|
| EP | 1785347 A3 | 3/2008 |
| WO | 2006023982 A1 | 3/2006 |

OTHER PUBLICATIONS

Joe Rea, "Boeing 777 High Lift Control System," IEEE AES System Magazine, manuscript, Aug. 1993, 7 pages.

Y.C. Yeh, "Design Consideration in Boeing 777 Fly-By-Wire Computers," Boeing Commercial Airplane Group Flight Systems, IEEE, 1998, 9 pages.

Y.C. Yeh, "Triple-Triple Redundant 777 Primary Flight Computer," Boeing Commercial Airplane Group Flight Systems, IEEE, 1996, 15 pages.

European Patent Office, "Search Report," issued in connection with application No. 18176849.0, dated Nov. 16, 2018, 14 pages.

United States Patent and Trademark Office, "Non-Final Office Action," issued in connection with U.S. Appl. No. 15/653,257, dated Jan. 22, 2019, 11 pages.

United States Patent and Trademark Office, "Notice of Allowance," issued in connection with U.S. Appl. No. 15/653,257, dated Jun. 12, 2019, 15 pages.

Canadian Patent Office, "Examination Search Report" issued in connection with Canadian Patent Application No. 3,004,547, dated May 12, 2021 (5 pages).

Canadian Patent Office, "Examiner's Requisition" issued in connection with Canadian Appl. No. 3,004,547, dated Mar. 31, 2022, 5 pages.

Brazilian Patent Office, "Examination Report," issued in connection with Brazil Patent Application No. BR102018011736-0, dated Sep. 9, 2022, 5 pages.

European Patent Office, "Examination Report," issued in connection with European Patent Application No. 18 176 849.0-1012, dated Oct. 28, 2022, 6 pages.

Canadian Patent Office, "Examiner's Requisition" issued in connection with Canadian Appl. No. 3,004,547, dated Dec. 15, 2022, 3 pages.

* cited by examiner

METHODS AND APPARATUS FOR A DISTRIBUTED AIRCRAFT ACTUATION SYSTEM

RELATED APPLICATION

This patent arises from a continuation of U.S. patent application Ser. No. 15/653,257, (Now U.S. Pat. No. 10,450, 055) which was filed on Jul. 18, 2017, which claims the benefit of the filing date of U.S. Provisional Patent Application Ser. No. 62/520,288, which was filed on Jun. 15, 2017. U.S. patent application Ser. No. 15/653,257 and U.S. Provisional Patent Application Ser. No. 62/520,288 are hereby incorporated by reference in their entireties. Priority to U.S. patent application Ser. No. 15/653,257 and U.S. Provisional Patent Application Ser. No. 62/520,288 is hereby claimed.

FIELD OF THE DISCLOSURE

This disclosure relates generally to aircraft and, more particularly, to methods and apparatus for a distributed aircraft actuation system.

BACKGROUND

When traveling at transonic speeds, many aircraft employ actuators (e.g., dynamic control surfaces, engines, etc.) to reduce drag and enhance aerodynamic properties. The aircraft may adjust control surfaces such as flaps and slats operatively coupled to an aircraft wing, or elevators or rudders operatively coupled to an aircraft tail, to compensate for effects of transonic airflow. The aircraft may adjust the dynamic surfaces to mitigate an effect of a change in a flight condition or an operating condition of an aircraft component.

Figure 1:
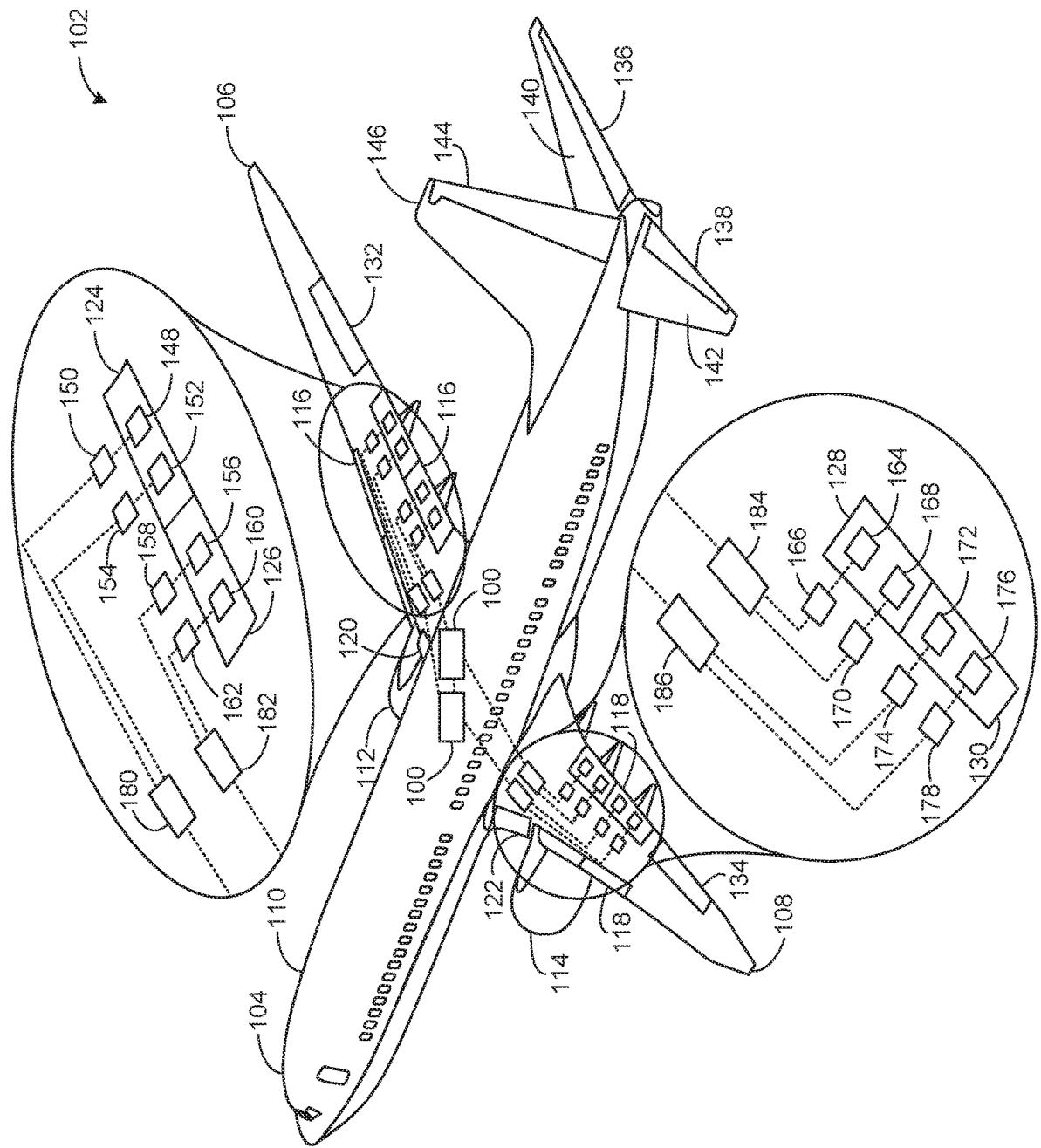
FIG. 1 illustrates an example actuator system manager apparatus coupled to an example aircraft monitoring an example actuator system of the example aircraft.

The figures are not to scale. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

DETAILED DESCRIPTION

Methods, apparatus, and articles of manufacture for a distributed aircraft actuation system are disclosed. An example apparatus includes a collection engine to obtain first monitoring information corresponding to a first set of control surfaces of an aircraft, the first set including a first control surface on a first side of the aircraft and a second control surface on a second side of the aircraft, the second side opposite the first, and obtain second monitoring information corresponding to a second set of control surfaces of the aircraft, the second set including a third control surface on the first side and a fourth control surface on the second side. The example apparatus further includes a non-responsive component detector to determine if one of the control surfaces is non-responsive based on the first and the second monitoring information, and a command generator to deactivate the first set when the non-responsive component detector determines that the first control surface is non-responsive while the second set remains active.

An example method includes obtaining first monitoring information corresponding to a first set of control surfaces of an aircraft, the first set including a first control surface on a first side of the aircraft and a second control surface on a second side of the aircraft, the second side opposite the first, and obtaining second monitoring information corresponding to a second set of control surfaces of the aircraft, the second set including a third control surface on the first side and a fourth control surface on the second side. The example method further includes determining if one of the control surfaces is non-responsive based on the first and the second monitoring information, and in response to determining that the first control surface is non-responsive, deactivating the first set while the second set remains active.

An example non-transitory computer readable storage medium comprising instructions which, when executed, cause a machine to at least obtain first monitoring information corresponding to a first set of control surfaces of an aircraft, the first set including a first control surface on a first side of the aircraft and a second control surface on a second side of the aircraft, the second side opposite the first, and obtain second monitoring information corresponding to a second set of control surfaces of the aircraft, the second set including a third control surface on the first side and a fourth control surface on the second side. The example non-transitory computer-readable storage medium further includes instructions which, when executed, cause the machine to at least determine if one of the control surfaces is non-responsive based on the first and the second monitoring information, and deactivate the first set when the first control surface is determined to be non-responsive while the second set remains active.

Typical aircraft use dynamic control surfaces such as flaps and slats to optimize aerodynamic properties of the aircraft. Additionally or alternatively, typical aircraft may use ailerons, elevators, rudders, spoilers, etc., to optimize the aerodynamic properties of the aircraft. Flaps are aerodynamic surfaces on a leading edge (e.g., a Krueger flap, etc.) or a trailing-edge of a wing of an aircraft that can be used to increase lift of the wing at a given airspeed. For example, deploying the flap(s) during flight may increase the lift-to-drag ratio experienced by the aircraft to lower the approach speed of the aircraft and/or to increase the angle of attack for landing (e.g., the angle of descent, etc.).

In some examples, the flaps are operatively coupled to one or more actuators (e.g., an electromechanical actuator, an electrohydraulic actuator, an electric backup hydraulic actuator, a hydraulic actuator, etc.) to move them from a stowed position to a deployed position, or an intermediate position. An actuator may be operatively coupled to a motor (e.g., an electric motor, a hydraulic motor, etc.), where a rate of motor rotation may be determined by a processor. For example, a processor may determine that an increased level of lift is necessary for an aircraft maneuver and calculate a desired position of one or more flaps. The processor may calculate a required rate at which and/or a duration for which a shaft of the motor may be rotated to enable the actuator to move the flap from its current position to the desired flap position. As used herein, the term "control surface component" refers to an electrical or a mechanical component related to monitoring or operating a control surface (e.g., a flap, a slat, etc.). For example, a control surface component may be a flap-related component such as an actuator, a bushing, a jack screw, a motor, a roller, a shaft, a sensor, a torque tube, etc.

In some instances, the processor calculates a required rate at which and/or a duration for which one or more shafts may be rotated, where the shaft(s) are operatively coupled to one or more motors operatively coupled to one or more actuators to enable the movement of one or more flaps. Alternatively, the flaps may be fixed in position, shape, and/or size. Additionally and/or alternatively, one or more flaps may be deployable (e.g., one or more flaps may adjust in position) while the remaining flaps may be fixed in position.

Some example actuator systems include multiple actuators that operate in parallel or simultaneously to move a control surface of an aircraft. For example, an actuator system may have a first motor operatively coupled to a first actuator of a flap and a second motor operatively coupled to a second actuator of the flap. The processor may transmit a command to a first motor controller to turn the first motor at a rate, and transmit the command to a second motor controller to turn the second motor at the same rate.

In some examples, the first motor turns at a different rate compared to the rate specified by the command. The first motor may turn at a different rate due to non-optimal motor operating conditions such as a degraded motor component, debris build-up on a motor component, etc. In some instances, the first motor may turn at a different rate due to a non-responsive sensor monitoring a control surface component such as a position sensor, a skew position sensor, an electric power usage sensor (e.g., a voltage sensor, a current sensor, etc.), a hydraulic parameter sensor (e.g., a hydraulic rate sensor, a hydraulic pressure sensor, etc.), a motor speed sensor, etc. As used herein, the term "non-responsive" refers to a condition or a status of an electrical or a mechanical component that is non-operational, non-functioning, and/or not providing an accurate or a reliable feedback measurement. For example, a non-responsive speed sensor may provide the processor with an erroneous feedback measurement and, thus, cause the processor to transmit an erroneous command to the first motor controller, where the erroneous command directs the first motor to turn at the different rate (e.g., a rate different than the second motor, etc.).

In prior actuator system implementations, when the first and the second motors turn at different rates, a flap skew occurs. Flap skew occurs when either an inboard or an outboard edge of the flap moves farther than the rest of the flap. For example, if the first motor turns at a rate faster than the second motor, then the first actuator may lead the second actuator causing a flap skew. When the flap skew satisfies a flap skew threshold, the processor may disable an aircraft flap system (e.g., an entire leading-edge flap system, an entire trailing-edge flap system, etc.) including the affected flap to prevent damage to the affected flap and surrounding structure. The disabling of the aircraft flap system may result in an increase in approach speeds of the aircraft and, thus, may result in a diversion of the aircraft. In previous implementations, all of the leading-edge and/or trailing-edge flaps are electrically coupled to each other due to cost and weight considerations of each flap having a corresponding actuation system. Other conditions that may cause the processor to disable the aircraft flap system include detecting one or more non-responsive control surface components.

Example actuator system manager (ASM) apparatus disclosed herein are operative to monitor a distributed aircraft actuation system. The example ASM apparatus may be implemented by one or more flight control modules (FCM) that monitor and control flight control electronics (FCE) of an aircraft. In some disclosed examples, the distributed aircraft actuation system includes two or more flaps where each flap has a corresponding actuation system. In other disclosed examples, the distributed aircraft actuation system includes two or more sets of flaps where each set of flaps has a corresponding actuation system. For example, the distributed aircraft actuation system may include a first and a second set of flaps. The first set of flaps includes a first flap on a first side of an aircraft electrically coupled to a second flap on a second side of the aircraft, where the second side is opposite the first side (e.g., on different sides of an aircraft fuselage, etc.). The second set of flaps includes a third flap on the first side electrically coupled to a fourth flap on the second side.

Some disclosed example ASM apparatus obtain monitoring information (e.g., actuation system information, control surface component information, etc.) corresponding to the distributed aircraft actuation system including sensor information, data communication status information, component power consumption information, etc. Sensor information may include information obtained from a sensor monitoring a control surface component such as a position sensor, a skew position sensor, an electric power usage sensor, etc. Data communication status information may include information corresponding to an operational status or a health status of a data communication bus such as whether a data communication bus is functioning correctly or optimally. Component power consumption information may include information corresponding to an amount of current or voltage supplied to a control surface component such as a motor, an actuator, etc.

Some disclosed example ASM apparatus monitor the distributed aircraft actuation system to detect non-responsive control surface components. The example ASM apparatus may deactivate a control surface or a set of control surfaces based on a detected non-responsive control surface component, while the remaining control surfaces or the remaining set(s) of control surface components remain activated. In some disclosed examples, the ASM apparatus may deactivate the distributed aircraft control system when the control surface or the set of control surfaces are not deactivated successfully. As used herein, the term "deactivate" refers to the example ASM apparatus disabling one or more corresponding control surface components when a non-responsive control surface component is detected. For example, disabling may include removing power from a control surface component, moving a control surface component from a first position to a second position, etc.

FIG. 1 illustrates an example actuator system manager (ASM) 100 monitoring an example distributed aircraft actuation system 102 coupled to an example aircraft 104. The aircraft 104 includes first and second wings 106, 108 coupled to a fuselage 110. First and second engines 112, 114 are coupled to the wings 106, 108. First and second slats 116, 118, first and second leading-edge flaps 120, 122, and first through fourth trailing-edge flaps 124, 126, 128, 130 are operatively coupled to the wings 106, 108. In the illustrated example, the leading-edge flaps 120, 122 are Krueger flaps. Additional aircraft control surfaces of the aircraft include first and second ailerons 132, 134, first and second elevators 136, 138 operatively coupled to first and second horizontal stabilizers 140, 142 and a rudder 144 operatively coupled to a vertical stabilizer 146.

In the illustrated example of FIG. 1, the first flap 124 is operatively coupled to a first actuator 148, where a first sensor 150 is monitoring the first actuator 148 and a second actuator 152, where a second sensor 154 is monitoring the second actuator 152. Similarly, the second flap 126 is operatively coupled to a third actuator 156, where a third sensor 158 is monitoring the third actuator 156 and a fourth actuator 160, where a fourth sensor 162 is monitoring the fourth actuator 160.

On the opposite side of the aircraft 104 in the illustrated example of FIG. 1, the third flap 128 is operatively coupled to a fifth actuator 164, where a fifth sensor 166 is monitoring the fifth actuator 164 and a sixth actuator 168, where a sixth sensor 170 is monitoring the sixth actuator 168. Similarly, the fourth flap 130 is operatively coupled to a seventh actuator 172, where a seventh sensor 174 is monitoring the seventh actuator 172, and an eighth actuator 176, where an eighth sensor 178 is monitoring the eighth actuator 176.

In the illustrated example, the first through the eighth actuators 148, 152, 156, 160, 164, 168, 172, 176 are electromechanical actuators (e.g., brushless direct current actuators, etc.). Alternatively, the first through eight actuators 148, 152, 156, 160, 164, 168, 172, 176 may be electrohydraulic actuators, electric backup hydraulic actuators, etc. In the illustrated example, the first through the eighth sensors 150, 154, 158, 162, 166, 170, 174, 178 are position sensors. Alternatively, the first through the eighth sensors 150, 154, 158, 162, 166, 170, 174, 178 may be skew position sensors, electric power usage sensors, hydraulic parameter sensors, etc. In some examples, the aircraft 104 uses more than one type of actuation system sensor. For example, the aircraft 104 may use one or more position sensors, skew position sensors, electric power usage sensors, etc., and/or a combination thereof to monitor the distributed aircraft actuation system 102. Although there are eight actuators and eight sensors depicted in the illustrated example, there may be fewer or more actuators and/or sensors used.

In the illustrated example of FIG. 1, control surface components corresponding to the first and the second flaps 124, 126 are electrically coupled to an actuator controller. For example, the first and the second actuators 148, 152 and the first and the second sensors 150, 154 are electrically coupled to a first actuator controller 180 and the third and the fourth actuators 156, 160 and the third and the fourth sensors 158, 162 are electrically coupled to a second actuator controller 182. Similarly, on the opposite side of the aircraft 104, control surface components corresponding to the third and the fourth flaps 128, 130 are electrically coupled to an actuator controller. For example, the fifth and the sixth actuators 164, 168 and the fifth and the sixth sensors 166, 170 are electrically coupled to a third actuator controller 184 and the seventh and the eighth actuators 172, 176 and the seventh and the eighth sensors 174, 178 are electrically coupled to a fourth actuator controller 186.

In the illustrated example, the first through fourth actuator controllers 180, 182, 184, 186 are remote electronic units (REUs) that transmit commands to the first through the eighth actuators 148, 152, 156, 160, 164, 168, 172, 176 and obtain sensor information from the first through the eighth sensors 150, 154, 158, 162, 166, 170, 174, 178. For example, the ASM 100 may transmit a command to the first actuator 148 and obtain sensor information from the first sensor 150 via the first actuator controller 180. Although there are four actuator controllers depicted in the illustrated example, there may be fewer or more than four actuator controllers used. In the illustrated example, each of the actuator controllers 180, 182, 184, 186 is electrically coupled to one of the ASMs 100. Although there are two ASMs 100 depicted in the illustrated example, there may be one or more than two ASMs 100 used. For clarity purposes, while the functions of the example ASMs 100 described below are described in the singular form, the described functionality applies to all ASMs 100.

In the illustrated example of FIG. 1, the ASM 100 monitors the first through the eighth actuators 148, 152, 156, 160, 164, 168, 172, 176 and the first through the eighth sensors 150, 154, 158, 162, 166, 170, 174, 178 to detect if one or more actuators and/or sensors are non-responsive. For example, the ASM 100 may calculate a position difference between the first and the second actuators 148, 152. The example ASM 100 may compare the position difference to a threshold and determine whether the position difference satisfies the threshold (e.g., the position difference is greater than 0.05 meters, 0.1 meters, 0.5 meters, etc.). The example ASM 100 may determine that the first actuator 148 is non-responsive when the difference satisfies the threshold. For example, the ASM 100 may determine that the position difference between the second actuator 152 relative to the first actuator 148 is 0.1 meters. The example ASM 100 may determine that the position difference of 0.1 meters corresponds to the second actuator 152 leading the first actuator 148 by 0.1 meters. The first actuator 148 may be lagging the second actuator 152 due to a non-responsive control surface component, a motor operatively coupled to the first actuator 148 turning at a slower rate than a motor operatively coupled to the second actuator 152, etc. The example ASM 100 may deactivate the first and the second actuators 148, 152 based on the position difference satisfying the threshold (e.g., the position difference is greater than 0.05 meters, etc.), while the remaining third through eighth actuators 156, 160, 164, 168, 172, 176 remain active.

In some examples, the ASM 100 deactivates a set of actuators of a first flap by removing power from a first one of the set and moving a second one of the set to a current position of the first one. If the set of actuators is deactivated successfully, then the set of actuators may be re-enabled. If the set of actuators is not deactivated successfully, then the example ASM 100 deactivates the second one of the set and moves the first one of the set to a current position of the second one and generates an alert. The example ASM 100 may move a corresponding second flap to a current position of the first flap when the first flap is deactivated.

For example, the ASM 100 may determine that the first actuator 148 is lagging the second actuator 152 based on calculating a position difference, a skew difference, a force difference (e.g., resulting from a force fight, etc.), etc., between the first and the second actuators 148, 152. The example ASM 100 may deactivate the leading second actuator 152 and command the lagging first actuator 148 to move to a current position of the leading second actuator 152 to enable the lagging first actuator 148 to catch up to the second leading actuator 152 within a time window (e.g., within 3 seconds, 30 seconds, 2 minutes, etc.). If the lagging first actuator 148 does not catch up to the leading second actuator 152 within the time window, then the example ASM 100 may deactivate the first flap 124 while the remaining second through the fourth flaps 126, 128, 130 remain active. For example, the ASM 100 may deactivate the lagging first actuator 148 and command the leading second actuator 152 to move to the current position of the lagging first actuator 148. The example ASM 100 may move the leading second actuator 152 to the current position of the lagging first actuator 148 to reduce undesired aerodynamic effects due to an asymmetrical position of the first flap 124. The example ASM 100 may command one of the second through the fourth flaps 126, 128, 130 to move to a current position of the first flap 124 to reduce undesired aerodynamic effects due to an asymmetrical position between two or more of the first through the fourth flaps 124, 126, 128, 130 while remaining flaps and corresponding actuators remain active. For example, the ASM 100 may command the fourth flap 130 and the corresponding seventh and the eighth actuators 172, 176 to move to the current position of the first flap 124 and the corresponding first and the second actuators 148, 152 while the remaining second and the third flaps 126, 128 and the corresponding third through the sixth actuators 156, 160, 164, 168 remain active.

Figure 2:
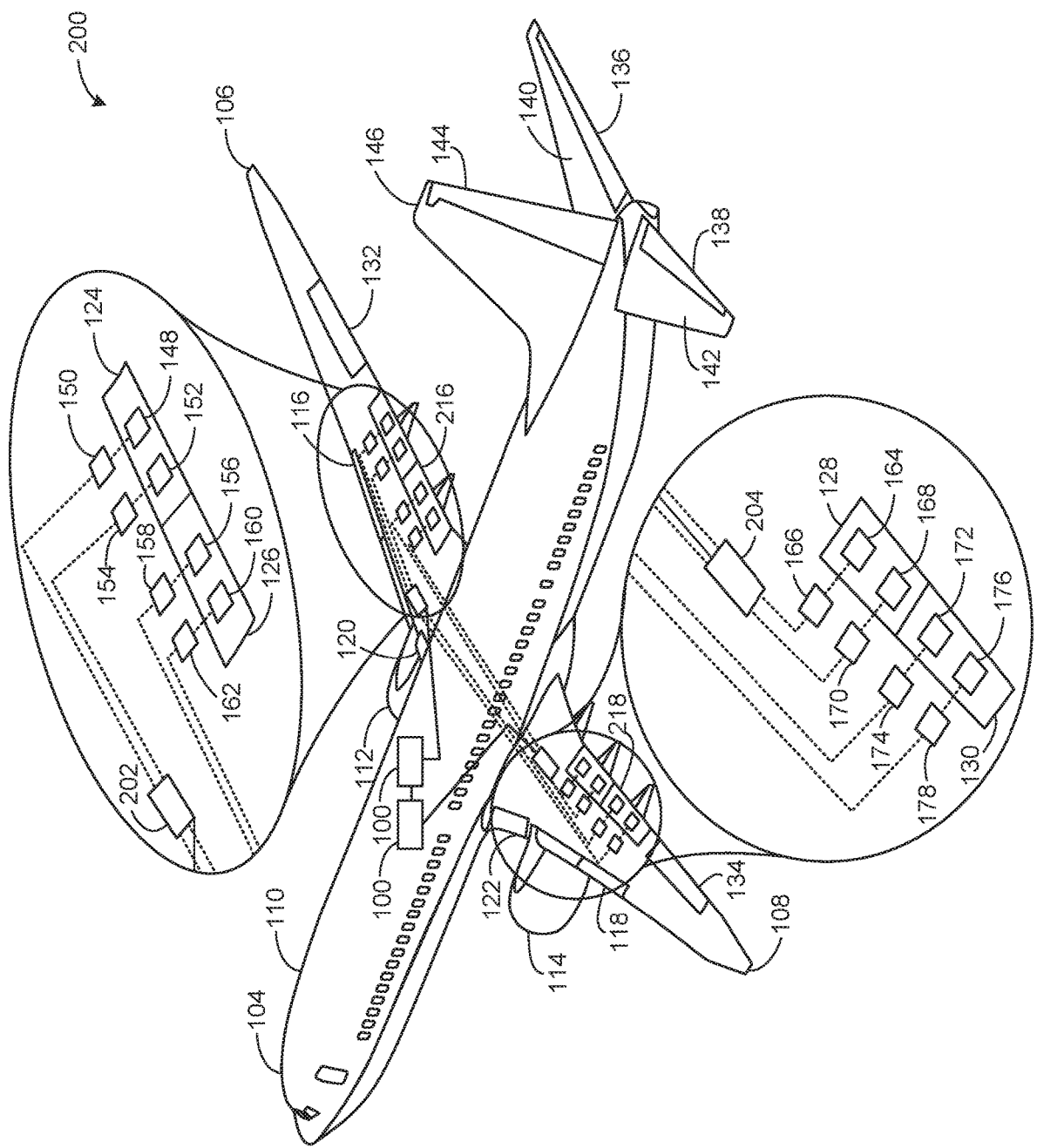
FIG. 2 illustrates the example actuator system manager apparatus of FIG. 1 coupled to another example aircraft monitoring another example actuator system of the another example aircraft.

FIG. 2 illustrates the ASM 100 monitoring another example distributed aircraft actuation system 200 coupled to the example aircraft 104 of FIG. 1. In the illustrated example, the first, the second, the seventh, and the eighth actuators 148, 152, 172, 176 and the first, the second, the seventh, and the eighth sensors 150, 154, 174, 178 are electrically coupled to a first example actuator controller 202. In the illustrated example, the third through the sixth actuators 156, 160, 164, 168 and the third through the sixth sensors 158, 162, 166, 170 are electrically coupled to a second example actuator controller 204. In the illustrated example, the first and the second actuator controllers 202, 204 are electrically coupled to the ASM 100 of FIG. 1.

In the illustrated example of FIG. 2, the first flap 124 is electrically coupled to the fourth flap 130, while the second flap 126 is electrically coupled to the third flap 128. For example, the first and the fourth flaps 124, 130 make up a first pair, a first set, etc., of control surface components, while the second and the third flaps 126, 128 make up a second pair, a second set, etc., of control surface components. In some examples, the ASM 100 deactivates a pair of electrically coupled flaps when the ASM 100 detects a non-responsive control surface component corresponding to the pair of electrically coupled flaps. In some instances, the ASM 100 deactivates the distributed aircraft actuation system 200 (e.g., the ASM 100 deactivates both pairs of flaps, etc.) when the ASM 100 cannot deactivate the pair of electrically coupled flaps that includes the detected non-responsive control surface component.

For example, the ASM 100 may determine that the first actuator 148 is lagging the second actuator 152 based on calculating a position difference, a skew difference, a force difference, etc., between the first and the second actuators 148, 152. The example ASM 100 may deactivate the leading second actuator 152 and command the lagging first actuator 148 to move to a current position of the leading second actuator 152 to enable the lagging first actuator 148 to catch up to the leading second actuator 152 within a time window (e.g., within 3 seconds, 30 seconds, 2 minutes, etc.). If the lagging first actuator 148 does not catch up to the leading second actuator 152 within the time window, then the example ASM 100 may deactivate the first flap 124. For example, the ASM 100 may deactivate the lagging first actuator 148 and command the leading second actuator 152 to move to the current position of the lagging first actuator 148. The example ASM 100 may move the leading second actuator 152 to the current position of the lagging first actuator 148 to reduce undesired aerodynamic effects due to an asymmetrical position of the first flap 124.

The example ASM 100 may deactivate a corresponding flap that is electrically coupled to the affected flap (e.g., the flap that includes the detected non-responsive control surface component, etc.). For example, the ASM 100 may deactivate the seventh and the eighth actuators 172, 176 if the first and the second actuators 148, 152 are not deactivated successfully, where the seventh and the eighth actuators 172, 176 are electrically coupled to the first and the second actuators 148, 152. For example, the example ASM 100 may command the fourth flap 130 to move to a current position of the first flap 124 to reduce undesired aerodynamic effects due to an asymmetrical position between the first and the fourth flaps 124, 130, while the remaining second and the third flaps 126, 128 and the corresponding third through the sixth actuators 156, 160, 164, 168 remain active.

Figure 3:
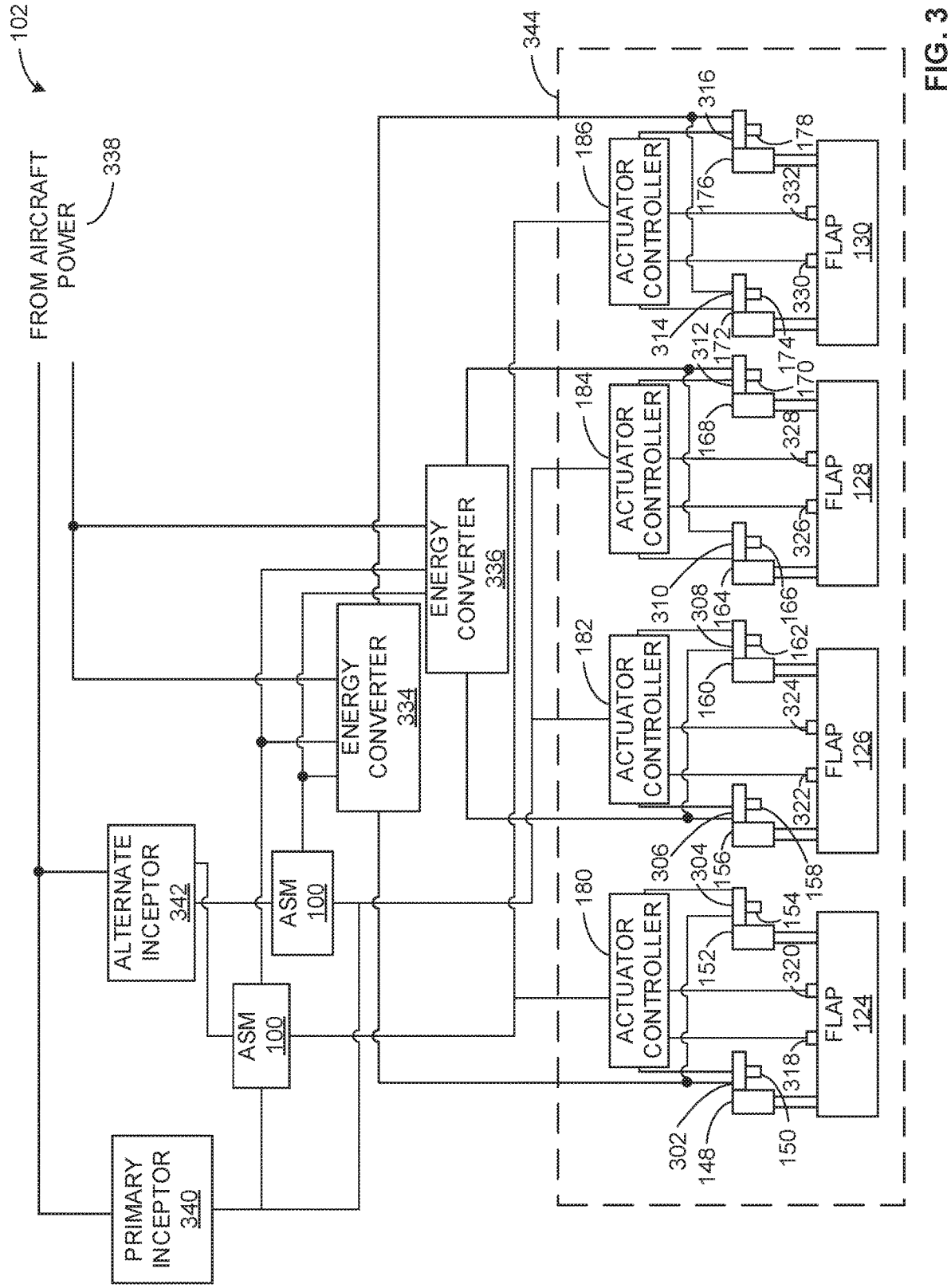
FIG. 3 is a block diagram of an example implementation of the example actuator system manager apparatus of FIG. 1 monitoring the example actuator system of FIG. 1.

FIG. 3 is a block diagram of an example implementation of the example ASM 100 monitoring the example aircraft actuation system 102 of FIG. 1. In the illustrated example, each of the flaps 124, 126, 128, 130 has a corresponding actuation system including a motor. In the illustrated example, a first through an eighth motor 302, 304, 306, 308, 310, 312, 314, 316 are electric motors (e.g., alternating current inductive motors, etc.). Alternatively, the first through the eighth motors 302, 304, 306, 308, 310, 312, 314, 316 may be electromechanical motors, hydraulic motors, etc. The first through the eighth motors 302, 304, 306, 308, 310, 312, 314, 316 are operatively coupled to the first through the eighth actuators 148, 152, 156, 160, 164, 168, 172, 176 to move the first through the eighth actuators 148, 152, 156, 160, 164, 168, 172, 176 at a specified rate. In the illustrated example, two skew position sensors monitor each flap. Alternatively, one or more than two skew position sensors may monitor each flap. For example, a first and a second skew position sensor 318, 320 measure a flap skew of the first flap 124, a third and a fourth skew position sensor 322, 324 measure a flap skew of the second flap 126, a fifth and a sixth skew position sensor 326, 328 measure a flap skew of the third flap 128, and a seventh and an eighth skew position sensor 330, 332 measure a flap skew of the fourth flap 130.

In the illustrated example, the first flap 124 is electrically coupled to the first actuator 148, which is controlled by the first motor 302. In the illustrated example, the first sensor 150 monitors the first actuator 148. For example, the first sensor 150 may be a position sensor that monitors a position of the first actuator 148. Alternatively, the first sensor 150 may monitor the first motor 302. For example, the first sensor 150 may be an electric power usage sensor that monitors an amount of voltage and/or current applied to the first motor 302. In yet another example, the first sensor 150 may be a hydraulic parameter sensor that monitors a hydraulic flow rate, a hydraulic pressure, etc. In some examples, the first sensor 150 is integrated into the first actuator 148, the first motor 302, etc. In some instances, more than one sensor may be utilized to monitor the first actuator 148 and the first motor 302. For example, a position sensor may be used to monitor a position of the first actuator 148 and an electric power usage sensor may be used to monitor an amount of current supplied to the first motor 302.

In the illustrated example of FIG. 3, each flap and corresponding control surface components are electrically coupled to a corresponding actuator controller. For example, the first flap 124, the first and the second actuators 148, 152, the first and the second sensors 150, 154, the first and the second motors 302, 304, and the first and the second skew position sensors 318, 320 are electrically coupled to the first actuator controller 180 of FIG. 1. The first through the fourth actuator controllers 180, 182, 184, 186 of FIG. 1 obtain sensor information from the first through the eighth sensors 150, 154, 158, 162, 166, 170, 174, 178 and/or the first through the eighth skew position sensors 318, 320, 322, 324, 326, 328, 330, 332 and transmit commands (e.g., a command to change a position of the first through the eighth actuators 148, 152, 156, 160, 164, 168, 172, 176, etc.) to the first through the eighth motors 302, 304, 306, 308, 310, 312, 314, 316. The first through the fourth actuator controllers 180, 182, 184, 186 are electrically coupled to the example ASM 100.

In the illustrated example of FIG. 3, each of the motors is electrically coupled to an energy converter. For example, the first, the second, the seventh, and the eighth motors 302, 304, 314, 316 are electrically coupled to a first energy converter 334. In another example, the third through the sixth motors 306, 308, 310, 312 are electrically coupled to a second energy converter 336. The first and the second energy converters 334, 336 convert a first voltage from aircraft power 338 to a second voltage corresponding to an operating voltage of the first through the eighth motors 302, 304, 306, 308, 310, 312, 314, 316, an operating voltage of the example ASM 100, etc. In the illustrated example, the aircraft power 338 powers a primary inceptor 340 and an alternate inceptor 342. In the illustrated example, the primary inceptor 340 and the alternate inceptor 342 are devices used to provide pilot control inputs to manually control the first through the fourth flaps 124, 126, 128, 130. The inceptor is an electromechanical device that translates a mechanical input to an electrical output. For example, the ASM 100 may adjust a position of one or more of the first through the fourth flaps 124, 126, 128, 130 based on an input obtained from the primary inceptor 340. The alternate inceptor 342 is used when the primary inceptor 340 is non-responsive. The alternate inceptor 342 provides the same functionalities as the primary inceptor 340.

A benefit to an implementation of the distributed aircraft actuation system 102 is that environmentally sensitive components (e.g., components with a lower tolerance to extreme salt conditions, temperature, vibrations, etc.) may be installed in a pressurized bay of the aircraft 104 and, thus, be further protected from one or more environmental conditions. For example, the control surface components in the dashed-box 344 may be installed in the wings 106, 108 of the aircraft 104, while the remaining components such as the ASM 100, the energy converters 334, 336, etc., may be installed in a pressurized bay of the aircraft 104.

Figure 4:
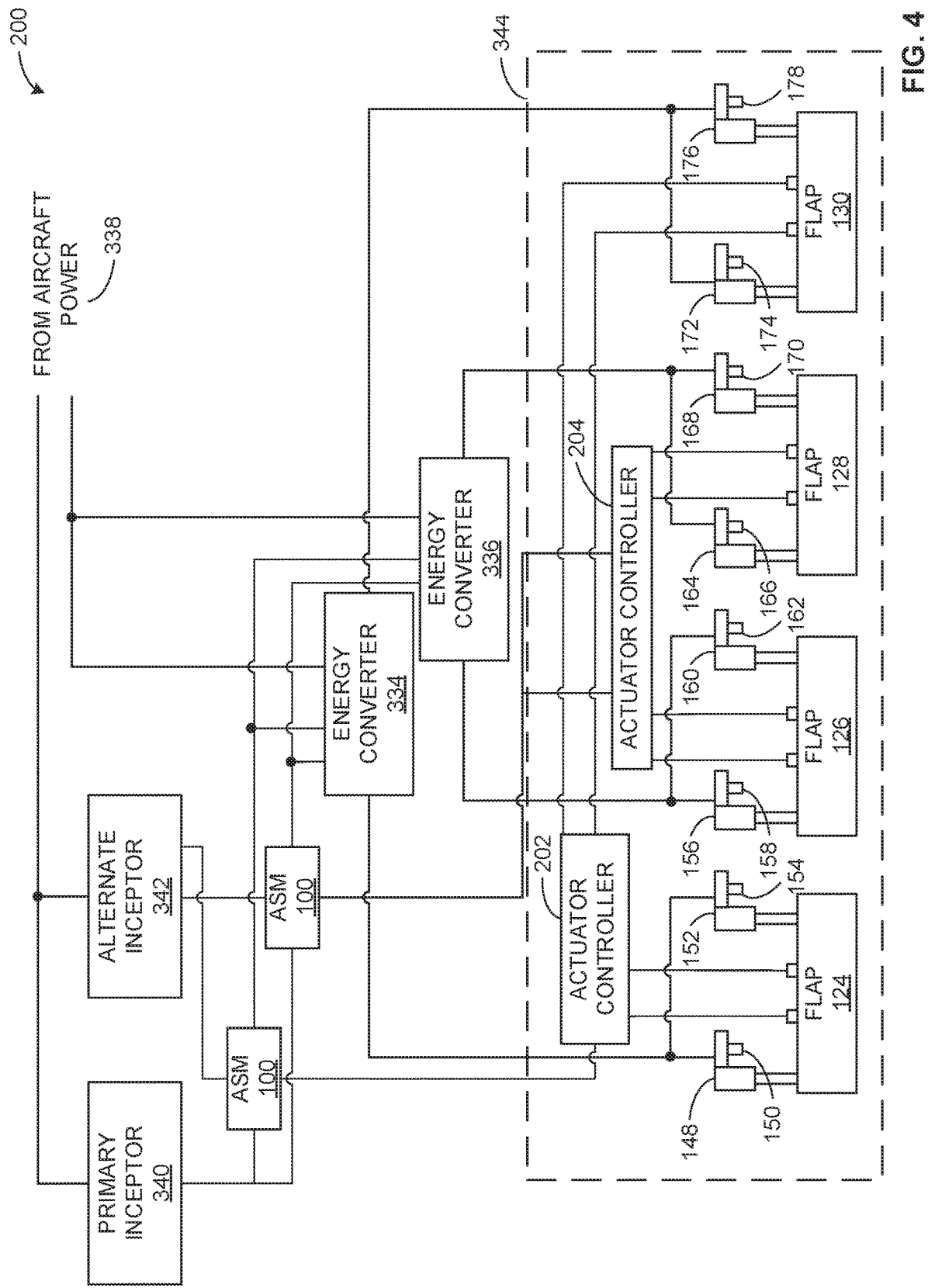
FIG. 4 is a block diagram of an example implementation of the example actuator system manager apparatus of FIG. 2 monitoring the example actuator system of FIG. 2.

FIG. 4 is a block diagram of another example implementation of the example ASM 100 monitoring the example aircraft actuation system 200 of FIG. 2. In the illustrated example, each pair of flaps has a corresponding actuation system and each pair of flaps is connected to a corresponding actuator controller. For example, the first and the fourth flaps 124, 130 are electrically coupled to each other via the first actuator controller 202 of FIG. 2, while the second and the third flaps 126, 128 are electrically coupled to each other via the second actuator controller 204 of FIG. 2.

In the illustrated example of FIG. 4, a reduction in a number of actuator controllers can be realized in comparison to FIG. 3 by pairing flaps and concentrating corresponding monitoring information. For example, sensor information corresponding to the first and the fourth flaps 124, 130 may be aggregated by the first actuator controller 202 prior to transmission to the ASM 100. In some examples, monitoring information corresponding to the first through the fourth flaps 124, 126, 128, 130 may be aggregated in existing actuator controllers that have spare input and/or output data acquisition and control channels. For example, sensor information corresponding to the first and the fourth flaps 124, 130 may be aggregated in a first spoiler remote electronic unit while sensor information corresponding to the second and the third flaps 126, 128 may be aggregated in a second spoiler remote electronic unit. Alternatively, any other remote electronic unit on the aircraft 104 may be used to obtain, aggregate, and transmit monitoring information corresponding to the first through the fourth flaps 124, 126, 128, 130. The reduction in the number of actuator controllers can reduce a complexity in design, implementation, and maintenance of a control system of the aircraft 104 of FIGS. 1-2. The reduction can further reduce a weight of the aircraft 104 and, thus, improve an efficiency of the aircraft 104.

Figure 5:
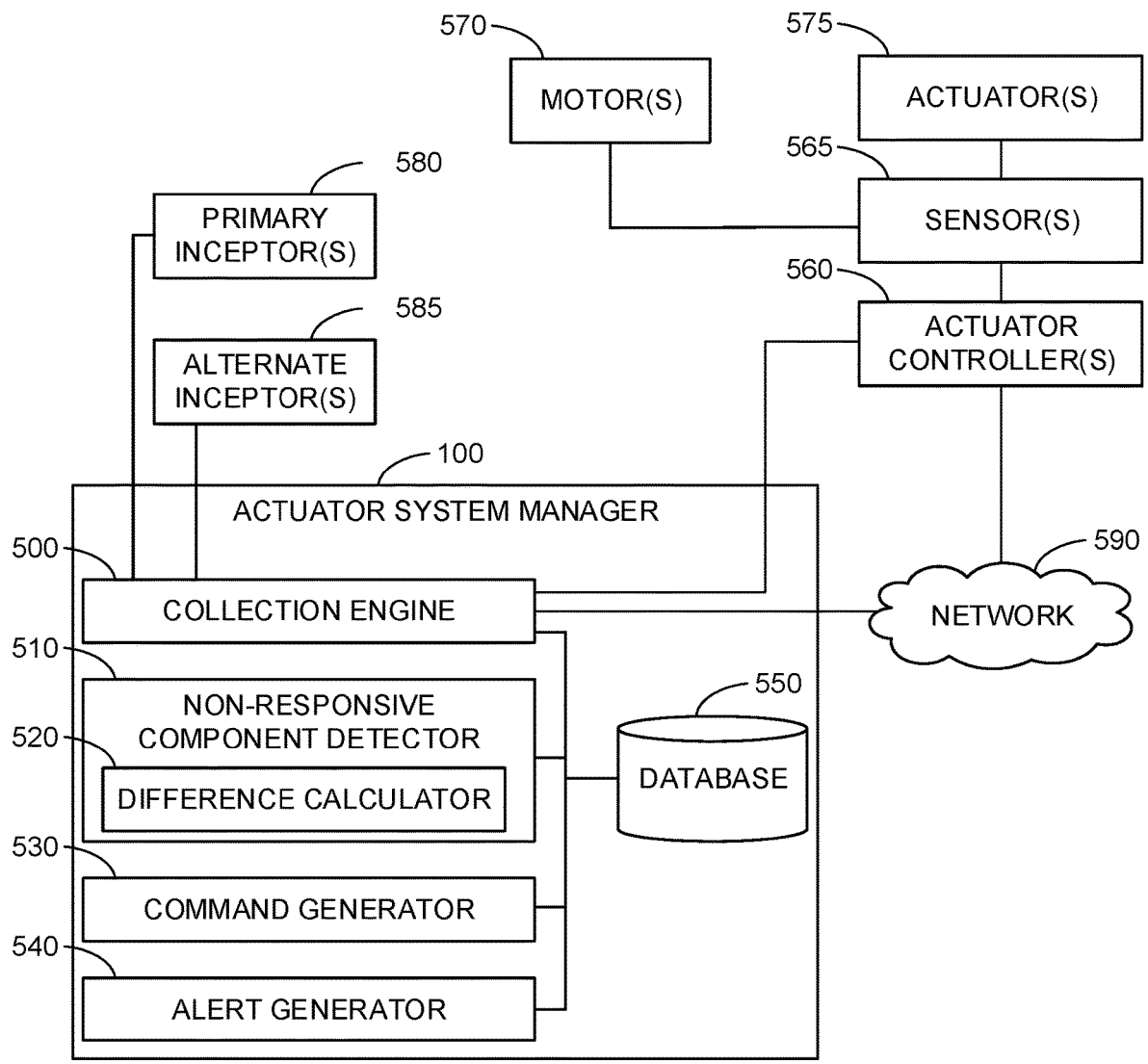
FIG. 5 is a block diagram of an example implementation of the example actuator system manager apparatus of FIGS. 1-4.

FIG. 5 is a block diagram of an example implementation of the example ASM 100 of FIGS. 1-4. The example ASM 100 obtains monitoring information (e.g., sensor information, etc.), inceptor command information (e.g., an output from the primary inceptor 340, the alternate inceptor 342, etc.), etc., and controls a position, a speed, etc. of one or more flaps. In some examples, the ASM 100 deactivates one or more flaps or one or more sets of flaps based on the obtained monitoring information. In the illustrated example, the ASM 100 includes an example collection engine 500, an example non-responsive component detector 510, which includes an example difference calculator 520, an example command generator 530, an example alert generator 540, and an example database 550.

In the illustrated example of FIG. 5, the ASM 100 includes the collection engine 500 to obtain monitoring information from an actuator controller 560. The actuator controller 560 may implement one or more of the first through the fourth actuator controllers 180, 182, 184, 186, of FIGS. 1 and 3, one or more of the first and the second actuator controllers 202, 204 of FIGS. 2 and 4, etc. The actuator controller 560 obtains sensor information from a sensor 565. The sensor 565 may implement one or more of the first through the eighth sensors 150, 154, 158, 162, 166, 170, 174, 178 of FIGS. 1-4, one or more of the first through the eighth sensors 318, 320, 322, 324, 326, 328, 330, 332 of FIGS. 3-4, etc. The sensor 565 monitors a motor 570 and/or an actuator 575. The motor 570 may implement one or more of the first through the eighth motors 302, 304, 306, 308, 310, 312, 314, 316 of FIGS. 3-4. The actuator 575 may implement one or more of the first through the eighth actuators 148, 152, 156, 160, 164, 168, 172, 176 of FIGS. 1-4. In the illustrated example, the collection engine 500 obtains information from a primary inceptor 580 and an alternate inceptor 585. The primary inceptor 580 may implement the primary inceptor 340 of FIGS. 3-4. The alternate inceptor 585 may implement the alternate inceptor 342 of FIGS. 3-4.

In some examples, the collection engine 500 obtains sensor information corresponding to a control surface component. For example, the collection engine 500 may obtain an amount of voltage and/or current applied to the motor 570, a position of the actuator 575, a flap skew between a pair of actuators 575, etc. In some examples, the collection engine 500 selects a control surface component or a control surface of interest to obtain and/or process corresponding monitoring information. For example, the collection engine 500 may obtain a position of the first actuator 148 via the first sensor 150. In another example, the collection engine 500 may select monitoring information corresponding to the first and the second actuators 148, 152, the first flap 124, etc., to process. In some examples, the collection engine 500 stores information (e.g., outputs from the primary inceptor 580, sensor information from the sensor 565, etc.) in the database 550. In some instances, the collection engine 500 retrieves information (e.g., sensor information from the sensor 565, electric power usage from the motor 570, etc.).

In the illustrated example of FIG. 5, the ASM 100 includes the non-responsive component detector 510 to determine if a component (e.g., an aircraft component, a control surface component, etc.) is non-responsive based on monitoring information obtained by the collection engine 500. For example, the non-responsive component detector 510 may determine if one or more flaps, actuators, sensors, motors, actuator controllers, etc., are non-responsive. For example, the non-responsive component detector 510 may determine if the first flap 124 is non-responsive based on monitoring information corresponding to the first and the second actuators 148, 152. In some examples, the non-responsive component detector 510 determines that a control surface component is non-responsive based on monitoring information obtained from the control surface component. For example, the non-responsive component detector 510 may determine that a motor controller is non-responsive based on obtaining a value of a self-check register in a database or a memory of the motor controller.

In another example, the non-responsive component detector 510 may determine if the first through the fourth actuator controllers 180, 182, 184, 186 of FIGS. 1 and 3, the first and the second actuator controllers of FIGS. 2 and 4 202, 204, etc., are non-responsive based on analyzing a health status of a data bus connection between the non-responsive component detector 510 and the first through the fourth actuator controllers 180, 182, 184, 186 of FIGS. 1 and 3, the first and the second actuator controllers 202, 204 of FIGS. 2 and 4, etc. For example, the non-responsive component detector 510 may determine a health status of the data bus connection between the ASM 100 and the first actuator controller 180 of FIGS. 1 and 3 based on a performance counter (e.g., a rolling counter, etc.), a checksum value, a number of data bytes sent, a number of data bytes received, etc., where the health status indicates whether the data bus connection is non-responsive. Additionally or alternatively, the example non-responsive component detector 510 may determine whether a data bus connection between an actuator controller and a control surface component is non-responsive. For example, the non-responsive component detector 510 may determine whether a data bus connection between the first actuator controller 180 of FIGS. 1 and 3 and the first motor 302 of FIG. 3 is non-responsive.

In some examples, the non-responsive component detector 510 identifies a non-responsive control surface component. For example, the non-responsive component detector 510 may identify the first flap 124, one or more of the corresponding first and the second actuators 148, 152, the first and the second sensors 150, 154, the first and the second motors 302, 304, etc., non-responsive based on obtained monitoring information (e.g., sensor information, etc.) and/or processed monitoring information (e.g., a calculated difference as calculated by the example difference calculator 520, etc.). In some examples, the non-responsive component detector 510 stores information (e.g., a health status of a data bus connection, etc.) in the database 550. In some instances, the non-responsive component detector 510 retrieves information (e.g., data bus information from the actuator controller 560, etc.) from the database 550.

In the illustrated example of FIG. 5, the example non-responsive component detector 510 includes the difference calculator 520 to calculate one or more differences based on monitoring information obtained by the collection engine 500. For example, the difference calculator 520 may calculate a position difference, a skew difference, a force difference, etc., between two or more control surface components. For example, the difference calculator 520 may calculate a position difference between the first and the second actuators 148 and 152. In another example, the difference calculator 520 may calculate a skew difference between the first and the second skew position sensors 318, 320. In yet another example, the difference calculator 520 may calculate a force difference between the first and the second motors 302, 304, where the force difference includes a difference in voltage, current, pressure (e.g., air pressure, hydraulic pressure, etc.), etc., applied to the first and the second motors 302, 304. The example difference calculator 520 determines whether a difference satisfies a threshold. For example, the difference calculator 520 may compare the position difference between the first and the second actuators 148, 152 to a threshold, and determine whether the position difference satisfies the threshold (e.g., the position difference is greater than 0.05 meters, 0.1 meters, 0.5 meters, etc.). In some examples, the difference calculator 520 stores information (e.g., a position difference, a skew position difference, a force difference, etc.) in the database 550. In some instances, the difference calculator 520 retrieves information (e.g., a position difference threshold, a skew position threshold, a force difference threshold, etc.) from the database 550.

In the illustrated example of FIG. 5, the ASM 100 includes the command generator 530 to generate a command to control a control surface component based on the non-responsive component detector 510 detecting a non-responsive control surface component. In some examples, the command generator 530 generates and transmits a command to move an actuator from a first position to a second position. For example, the command generator 530 may generate and transmit a command to the first motor 302 via the first actuator controller 180 of FIGS. 1 and 3 to turn at a target rate to move the first actuator 148 to a target position.

In some examples, the command generator 530 determines if a targeted control surface component executed the transmitted command. For example, the command generator 530 may compare an electric power usage parameter such as an amount of voltage or current applied to the first motor 302, etc., before and after the command is transmitted to the first motor 302 via the first actuator controller 180 of FIG. 3. If the same voltage is being applied to the first motor 302 before and after the command is transmitted to the first motor 302, then the command generator 530 may determine that the targeted control surface component did not execute the transmitted command (e.g., the first actuator controller 180 of FIGS. 1 and 3 is non-responsive, the first motor 302 is non-responsive, etc.).

In another example, the command generator 530 may transmit a command to the first motor 302 via the first actuator controller 180 of FIG. 3 to move the first actuator 148 to a target position. The example command generator 530 may compare a current position of the first actuator 148 to the target position. If the command generator 530 determines that the first actuator 148 does not move to the target position within a time window (e.g., within 3 seconds, 30 seconds, 3 minutes, etc.), then the command generator 530 deactivates the first actuator 148 and corresponding control surface components. For example, the command generator 530 may remove power from the first actuator 148, the first motor 302, etc., and transmit a command to the second motor 304 via the first actuator controller 180 of FIG. 3 to move the second actuator 152 to the current position of the first actuator 148.

In some examples, the command generator 530 generates and transmits an alert generation command to the alert generator 540 when a control surface component is deactivated. The example command generator 530 may include a control surface component identifier, a timestamp, etc., in the alert generation command. In some examples, the command generator 530 stores information (e.g., a generated command, etc.) in the database 550. In some instances, the command generator 530 retrieves information (e.g., a timer, time window threshold, etc.) from the database 550.

In the illustrated example of FIG. 5, the ASM 100 includes the alert generator 540 to generate an alert based on obtaining an alert generation command from the command generator 530. The alert may include information (e.g., monitoring information, etc.) corresponding to a non-responsive control surface component. For example, the alert may include a control surface component identifier, a health status of a corresponding data bus, a timestamp, a suggested mitigation measure for a pilot to take, etc. For example, the alert may include an indication that the first flap 124, the first actuator 148, the first sensor 150, the first motor 302, the first skew position sensor 318, etc., is non-responsive. The example alert generator 540 may generate an alert such as activating an audible alarm, activating a visual indicator (e.g., an LED, a status indicator on an instrument panel, a display message on a human machine interface, etc.), propagating an alert message throughout an aircraft control network (e.g., the network 590, etc.) generating a non-responsive log and/or report, etc.

In some examples, the alert generator 540 updates a value of a flag (e.g., enabling or disabling a flag in computer readable and/or machine readable instructions, etc.) based on obtaining the alert generation command from the command generator 530. For example, the alert generator 540 may enable a deactivation failed flag when one or more control surface components did not deactivate successfully. In some examples, the alert generator 540 stores information (e.g., the alert, a value of the deactivation failed flag, etc.) in the database 550. In some instances, the alert generator 540 retrieves information (e.g., the alert generation command, etc.) from the database 550.

In the illustrated example of FIG. 5, the ASM 100 includes the database 550 to record data (e.g., obtained monitoring information, calculated differences, thresholds, alerts, commands, etc.). The database 550 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 550 may additionally or alternatively be implemented by one or more double data rate (DDR) memories, such as DDR, DDR2, DDR3, DDR4, mobile DDR (mDDR), etc. The database 550 may additionally or alternatively be implemented by one or more mass storage devices such as hard disk drive(s), compact disk drive(s), digital versatile disk drive(s), solid-state disk drive(s), etc. While in the illustrated example the database 550 is illustrated as a single database, the database 550 may be implemented by any number and/or type(s) of databases. Furthermore, the data stored in the database 550 may be in any data format such as, for example, binary data, comma delimited data, tab delimited data, structured query language (SQL) structures, etc.

In the illustrated example of FIG. 5, the collection engine 500 obtains information (e.g., monitoring information, etc.) from the actuator controller 560 via a direct wired or wireless connection. Additionally or alternatively, the collection engine 500 obtains information from the actuator controller 560 via a network 590. In the illustrated example of FIG. 5, the network 590 is a bus and/or a computer network. For example, the network 590 may be an internal controller bus, an aircraft control network, etc. For example, the aircraft control network may utilize one or more communication protocols based on Aeronautical Radio, Incorporated (ARINC) specifications (e.g., ARINC 425, ARINC 629, ARINC 664, ARINC 1553, etc.). In some examples, the network 590 is a network with the capability of being communicatively coupled to the Internet. However, the network 590 may be implemented using any suitable wired and/or wireless network(s) including, for example, one or more data buses, one or more Local Area Networks (LANs), one or more wireless LANs, one or more cellular networks, one or more fiber optic networks, one or more satellite networks, one or more private networks, one or more public networks, etc. In the illustrated example, the network 590 enables the ASM 100 to be in communication with the sensor actuator controller 560. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

While an example manner of implementing the example ASM 100 of FIGS. 1-4 is illustrated in FIG. 5, one or more of the elements, processes and/or devices illustrated in FIG. 5 may be combined, divided, re-arranged, omitted, eliminated and/or implemented in any other way. Further, the example collection engine 500, the example non-responsive component detector 510, the example difference calculator 520, the example command generator 530, the example alert generator 540, the example database 550 and/or, more generally, the example ASM 100 of FIGS. 1-4 may be implemented by hardware, software, firmware and/or any combination of hardware, software and/or firmware. Thus, for example, any of the example collection engine 500, the example non-responsive component detector 510, the example difference calculator 520, the example command generator 530, the example alert generator 540, the example database 550 and/or, more generally, the example ASM 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection engine 500, the example non-responsive component detector 510, the example difference calculator 520, the example command generator 530, the example alert generator 540 and/or the example database 550 is/are hereby expressly defined to include a non-transitory computer readable storage device or storage disk such as a memory, a digital versatile disk (DVD), a compact disk (CD), a Blu-ray disk, etc. including the software and/or firmware. Further still, the example ASM 100 of FIGS. 1-4 may include one or more elements, processes and/or devices in addition to, or instead of, those illustrated in FIG. 5, and/or may include more than one of any or all of the illustrated elements, processes and devices.

Figure 6:
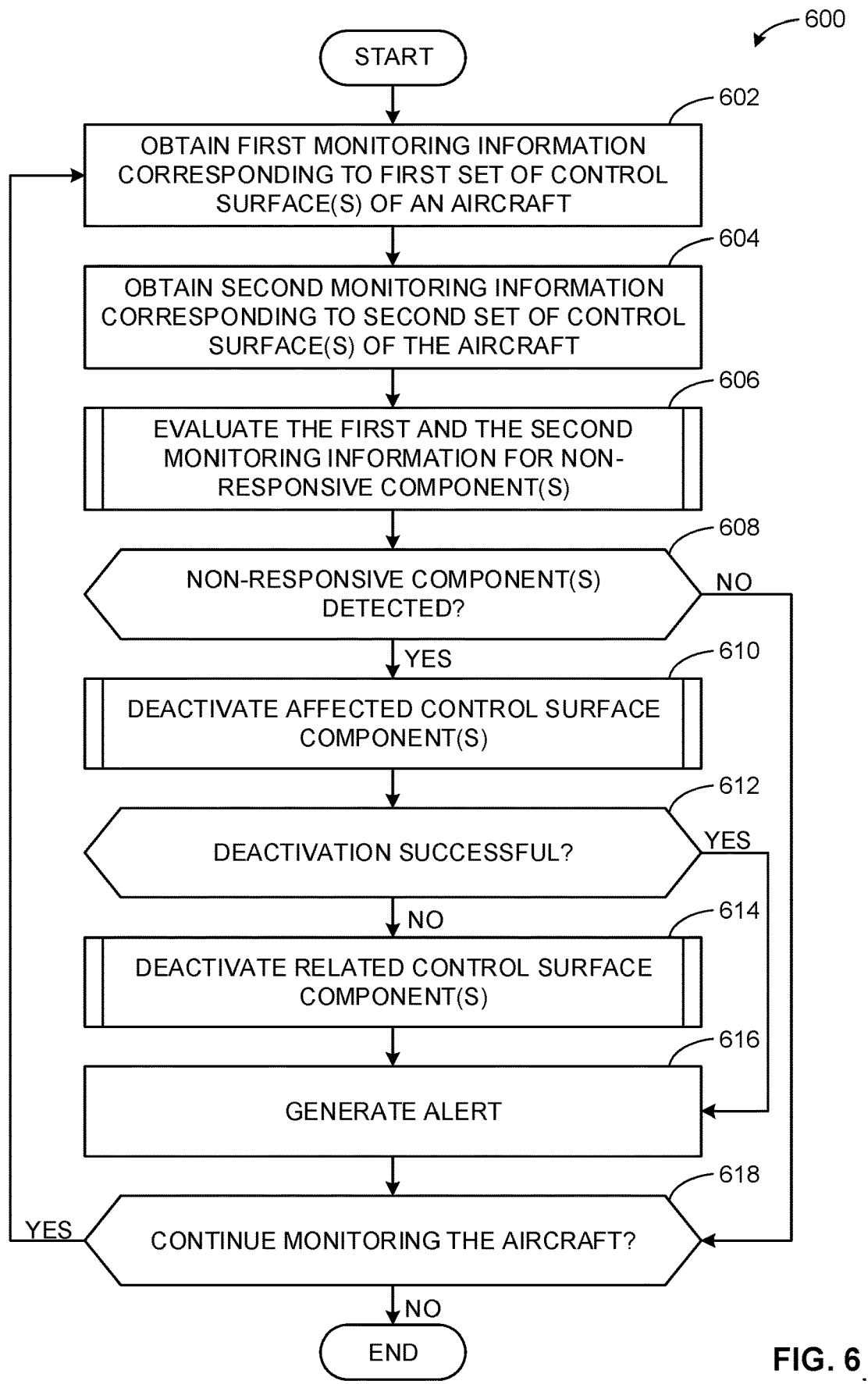
FIGS. 6-8 are flowcharts representative of example methods that may be executed by the example actuator system manager apparatus of FIGS. 1-5 to monitor an example actuator system of an example aircraft.
Figure 7:
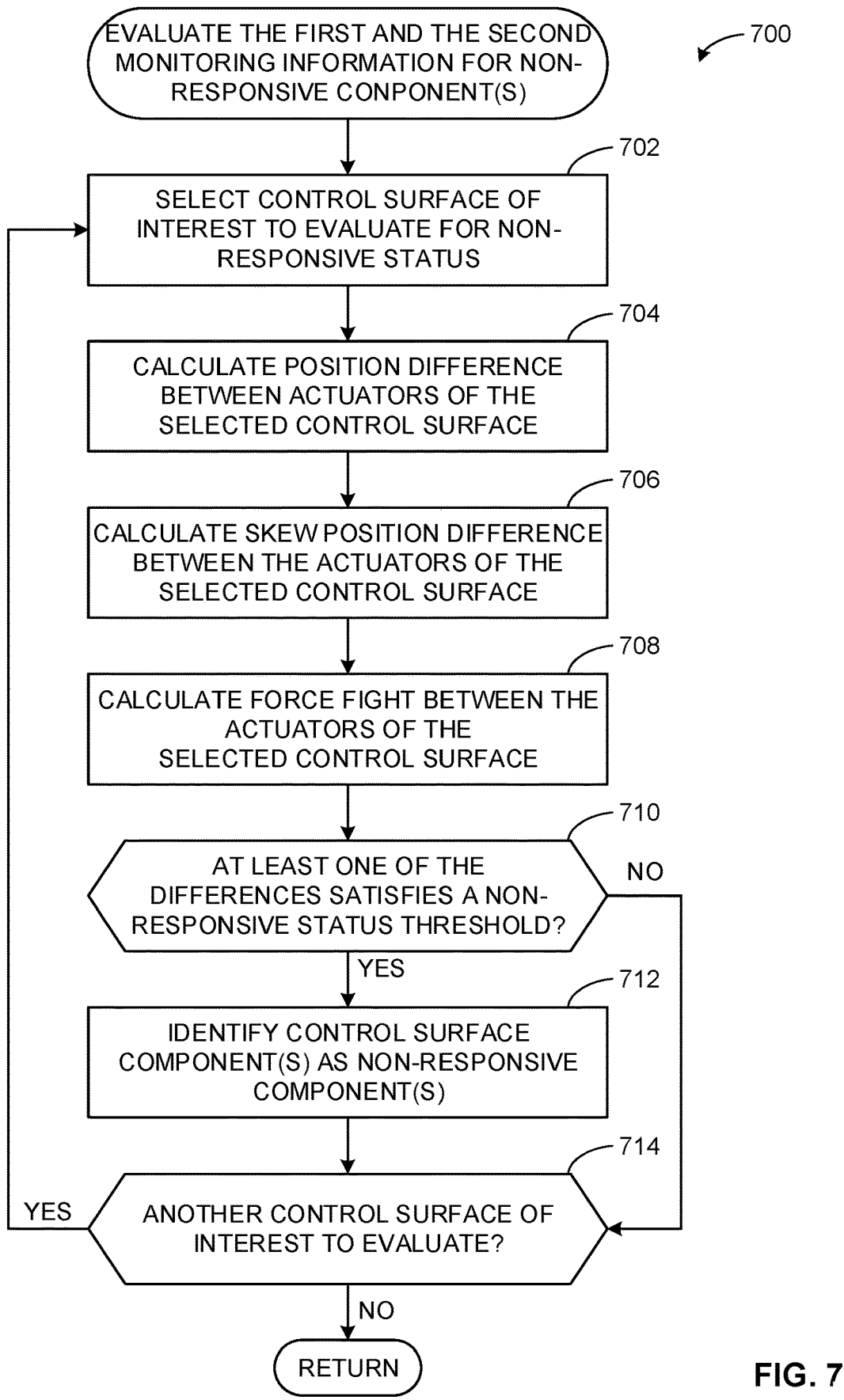
Figure 8:
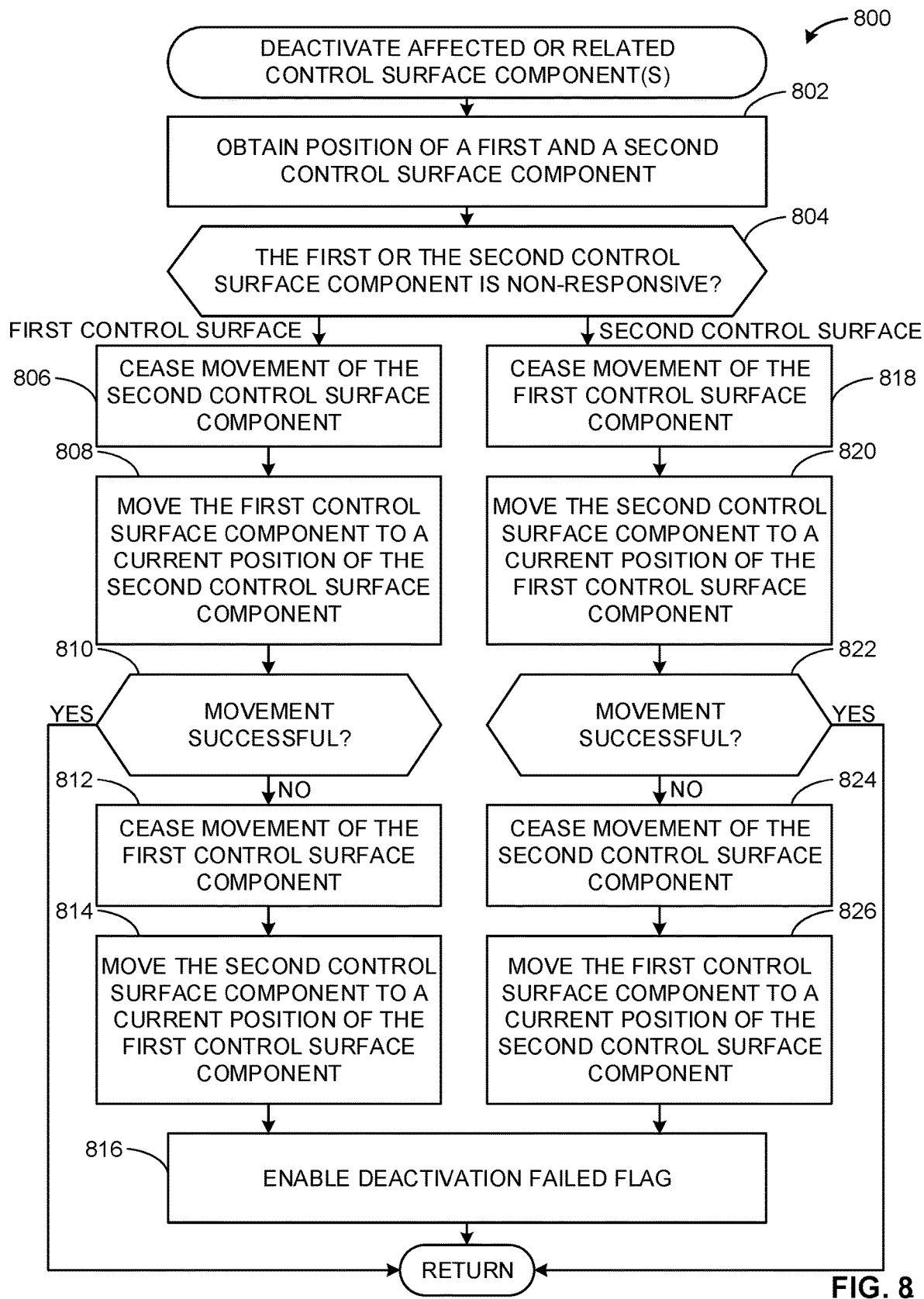

Flowcharts representative of example methods for implementing the example ASM 100 of FIGS. 1-5 is shown in FIGS. 6-8. In these examples, the methods may be implemented using machine readable instructions comprise a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 6-8, many other methods of implementing the example ASM 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 6-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 6 is a flowchart representative of an example method 600 that may be performed by the ASM 100 of FIGS. 1-5 to monitor the distributed aircraft actuation system 102 of FIGS. 1 and 3 and/or the distributed aircraft actuation system 200 of FIGS. 2 and 4. The example method 600 begins at block 602 when the example ASM 100 obtains first monitoring information corresponding to a first set of control surface(s) of an aircraft. For example, the collection engine 500 of FIG. 5 may obtain sensor information from the first and the second sensors 150, 154 corresponding to the first flap 124 of the aircraft 104 of FIGS. 1-2. At block 604, the example ASM 100 obtains second monitoring information corresponding to a second set of control surface(s) of the aircraft. For example, the collection engine 500 may obtain sensor information from the seventh and the eighth sensors 174, 178 corresponding to the fourth flap 130.

At block 606, the example ASM 100 evaluates the first and the second monitoring information for non-responsive component(s). For example, the non-responsive detector 510 may determine that the first flap 124 is non-responsive based on a corresponding control surface component such as the first actuator 148, the first sensor 150, the first motor 302 of FIGS. 3-4, etc., being non-responsive.

At block 608, the example ASM 100 determines whether non-responsive component(s) are detected. For example, the difference calculator 520 compare a position difference between the first actuator 148 and the second actuator 152 (e.g., based on one or more measurements from the first and the second sensors 150, 154, etc.) to a threshold and determine that the position difference satisfies the threshold (e.g., the position difference is greater than 0.05 meters, 0.1 meters, etc.). In another example, the difference calculator 520 may compare a force difference between the first motor 302 and the second motor 304 to a force difference threshold and determine that the force difference satisfies the threshold (e.g., the power difference is greater than 10 amps, 50 volts, 100 pounds per square inch (PSI), etc.).

If, at block 608, the example ASM 100 determines that a non-responsive component is not detected, control proceeds to block 618 to determine whether to continue monitoring the aircraft. If, at block 608, the example ASM 100 determines that a non-responsive component is detected, then, at block 610, the example ASM 100 deactivates the affected control surface component. For example, the command generator 530 may deactivate the first flap 124 or the first and the fourth flaps 124, 130 based on detecting one or more of the first and the second actuators 148, 152, the first and the second sensors 150, 154, the first and the second motors 302, 304, etc., being non-responsive, while the remaining second through the fourth flaps 126, 128, 130 or the remaining second and the third flaps 126, 128 remain active.

At block 612, the example ASM 100 determines whether the deactivation was successful. For example, the alert generator 540 may determine that a deactivation failed flag is enabled and, thus, indicating that the deactivation was not successful. For example, the command generator 530 may determine that the first actuator 148 did not reach a target position within a time window. In response to determining that the first actuator 148 did not reach the target position, the example alert generator 540 may enable the deactivation failed flag. In another example, the command generator 530 may determine that a voltage is still being applied to the first motor 302 in response to the command generator 530 transmitting a command to the first motor 302 to deactivate.

If, at block 612, the example ASM 100 determines that the deactivation was successful, control proceeds to block 616 to generate an alert. If, at block 612, the example ASM 100 determines that the deactivation was not successful, then, at block 614, the example ASM 100 deactivates related control surface component(s). For example, the command generator 530 may deactivate the second, the seventh, and the eighth actuators 152, 172, 176 when the non-responsive component detector 510 determines that the first actuator 148 is non-responsive, while the remaining third through the sixth actuators 156, 160, 164, 168 remain active. In another example, the command generator 530 may deactivate the fourth flap 130 when the non-responsive component detector 510 determines that the first flap 124 is non-responsive while the remaining second and the fourth flaps 126, 128 remain active.

At block 616, the example ASM 100 generates an alert. For example, the alert generator 540 of FIG. 5 may display a text-based message on a human machine interface on a pilot display in a cockpit of the aircraft 104. At block 618, the example ASM 100 determines whether to continue monitoring the aircraft. For example, the collection engine 500 may determine to continue monitoring the distributed aircraft actuation systems 102 of FIGS. 1 and 3 and/or the distributed aircraft actuation system 200 of FIGS. 2 and 4. If, at block 618, the example ASM 100 determines to continue monitoring the aircraft, control returns to block 602 to obtain additional first monitoring information, otherwise the example method 600 concludes.

Additional detail in connection with evaluating the first and the second monitoring information for non-responsive components (FIG. 6, block 606) is shown in FIG. 7. FIG. 7 is a flowchart representative of an example method 700 that may be performed by the ASM 100 of FIGS. 1-5 to evaluate the distributed aircraft actuation system 102 of FIGS. 1 and 3 and/or the distributed aircraft actuation system 200 of FIGS. 2 and 4 for non-responsive control surface components. The example method 700 begins at block 702 when the example ASM 100 selects a control surface of interest to evaluate for a non-responsive status. For example, the collection engine 500 of FIG. 5 may select the first flap 124 of FIGS. 1-4 to evaluate.

At block 704, the example ASM 100 calculates a position difference between actuators of the selected control surface. For example, the difference calculator 520 may calculate a position difference between the first and the second actuators 148, 152 of FIGS. 1-4 corresponding to the first flap 124 based on sensor information obtained from the first and the second sensors 150, 154 of FIGS. 1-4.

At block 706, the example ASM 100 calculates a skew position difference between the actuators of the selected control surface. For example, the difference calculator 520 may calculate a skew position difference between the first and the second actuators 148, 152 of FIGS. 1-4 corresponding to the first flap 124 based on sensor information obtained from the first and the second skew position sensors 318, 320 of FIGS. 3-4.

At block 708, the example ASM 100 calculates a force fight between the actuators of the selected control surface. For example, the difference calculator 520 may calculate a force difference (e.g., a voltage difference, a current difference, a pressure difference, etc.) between the first and the second actuators 148, 152 of FIGS. 1-4 corresponding to the flap 124 based on sensor information from an electric power usage sensor (e.g., the first and the second sensors 150, 154, etc.), a hydraulic parameter sensor, etc., monitoring the first and the second motors 302, 304 of FIGS. 3-4.

At block 710, the example ASM 100 determines whether at least one of the differences satisfies a non-responsive status threshold. For example, the difference calculator 520 may compare the position difference between the first and the second actuators 148, 152 to a threshold and determine whether the position difference satisfies the threshold (e.g., the position difference is greater than 0.05 meters, 0.1 meters, 0.5 meters, etc.).

If, at block 710, the example ASM 100 determines that none of the differences satisfies a non-responsive status threshold, control proceeds to block 714 to determine whether there is another control surface of interest to evaluate. If, at block 710, the example ASM 100 determines that at least one of the differences satisfies a non-responsive status threshold, then, at block 712, the ASM 100 identifies the control surface component(s) as non-responsive component(s). For example, the non-responsive component detector 510 may determine that one or both of the first and the second actuators 148, 152, one or both of the first and the second sensors 150, 154, one or both of the first and the second motors 302, 304, etc., are non-responsive based on at least one of the differences satisfying a non-responsive status threshold.

At block 714, the example ASM 100 determines whether there is another control surface of interest to evaluate. For example, the collection engine 500 may determine that the first through the fourth flaps 126, 128, 130, etc., may be evaluated. If, at block 714, the example ASM 100 determines that there is another control surface of interest to evaluate, control returns to block 702 to select another control surface of interest to evaluate for non-responsive status, otherwise the example method 700 concludes.

Additional detail in connection with deactivating affected control surface components (FIG. 6, block 610) or deactivating related control surface components (FIG. 6, block 614) is shown in FIG. 8. FIG. 8 is a flowchart representative of an example method 800 that may be performed by the ASM 100 of FIGS. 1-5 to deactivate one or more control surface components when a non-responsive component is detected. The example method 800 begins at block 802 when the example ASM 100 obtains a position of a first and a second control surface component. For example, the collection engine 500 of FIG. 5 may obtain a first flap position of the first flap 124 of FIGS. 1-4 and a second flap position of the fourth flap 130 of FIGS. 1-4. In another example, the collection engine 500 of FIG. 5 may obtain a first actuator position of the first actuator 148 of FIGS. 1-4 and a second actuator position of the second actuator 152 of FIGS. 1-4.

At block 804, the example ASM 100 determines whether the first or the second control surface component is non-responsive. For example, the non-responsive component detector 510 may determine that the first flap 124 is non-responsive. In such an example, the difference calculator 520 may calculate a position difference between the first and the fourth flaps 124, 130, compare the position difference to a threshold, and determine that the position difference satisfies the threshold (e.g., the position difference is greater than 0.05 meters, 0.1 meters, 0.5 meters, etc.). In another example, the non-responsive component detector 510 may determine that the first actuator 148 is non-responsive. In such an example, the difference calculator 520 may calculate a position difference between the first and the second actuators 148, 152, compare the position difference to a threshold, and determine that the position difference satisfies the threshold (e.g., the position difference is greater than 0.05 meters, 0.1 meters, 0.5 meters, etc.).

If, at block 804, the example ASM 100 determines that the first control surface component is non-responsive, then, at block 806, the ASM 100 ceases movement of the second control surface component. For example, the difference calculator 520 may determine that the first flap 124 is lagging the fourth flap 130. In response to determining that the first flap 124 is lagging the fourth flap 130, the example command generator 530 may remove power from the seventh and the eighth motors 314, 316 operatively coupled to the fourth flap 130 via the seventh and the eighth actuators 172, 176 to stop the fourth flap 130 from moving. In another example, the difference calculator 520 may determine that the first actuator 148 is lagging the second actuator 152. In response to determining that the first actuator 148 is lagging the second actuator 152, the example command generator 530 may remove power from the second motor 304 operatively coupled to the second actuator 152 to stop the second actuator 152 from moving.

At block 808, the example ASM 100 moves the first control surface component to a current position of the second control surface component. For example, the command generator 530 may transmit a command to the first flap 124 to move to the second flap position, where the second flap position is a current position of the fourth flap 130. In another example, the command generator 530 may transmit a command to the first actuator 148 to move to the second actuator position, where the second actuator position is a current position of the second actuator 152.

At block 810, the example ASM 100 determines whether the movement was successful. For example, the command generator 530 may determine that the first flap 124 did not move to the second flap position within a time window (e.g., within 3 seconds, 30 seconds, 3 minutes, etc.). In some examples, the command generator 530 determines that the first flap 124 did not move from the first flap position by comparing a current position of the first flap 124 to the first flap position. For example, the command generator 530 may determine that the first flap 124 is stuck in the first flap position and unable to move to the second flap position. In another example, the command generator 530 may determine that the first actuator 148 did not move to the second actuator position within a time window (e.g., within 3 seconds, 30 seconds, 3 minutes, etc.). In some examples, the command generator 530 determines that the first actuator 148 did not move from the first actuator position by comparing a current position of the first actuator 148 to the first actuator position. For example, the command generator 530 may determine that the first actuator 148 is stuck in the first actuator position and unable to move to the second actuator position.

If, at block 810, the example ASM 100 determines that the movement was successful, then the example method 800 concludes. For example, the command generator 530 may transmit a command to the first and the fourth flaps 124, 130 to resume normal operation, re-enable the fourth flap 130 (e.g., the fourth flap 130 may continue to move based on a command from the ASM 100 via the actuator controller 186 of FIGS. 1 and 3, etc.), etc. In another example, the command generator 530 may transmit a command to the first and the second actuators 148, 152 to resume normal operation, re-enable the second actuator 152 (e.g., the second actuator 152 may continue to move based on a command from the ASM 100 via the actuator controller 180 of FIGS. 1 and 3, etc.), etc.

If, at block 810, the example ASM 100 determines that the movement was not successful, then, at block 812, the example ASM 100 ceases movement of the first control surface component. For example, the command generator 530 may remove power from the first and the second motors 302, 304 operatively coupled to the first flap 124 via the first and the second actuators 148, 152 to stop the first flap 124 from moving. In another example, the command generator 530 may remove power from the first motor 302 operatively coupled to the first actuator 148 to stop the first actuator 148 from moving.

At block 814, the example ASM 100 moves the second control surface component to a current position of the first control surface component. For example, the command generator 530 may transmit a command to the fourth flap 130 to move to the first flap position, where the first flap position is a current position of the first flap 124. In such an example, the first and the fourth flaps 124, 130 are deactivated while the second and the third flaps 126, 128 remain operational, not deactivated, etc. In another example, the command generator 530 may transmit a command to the second actuator 152 to move to the first actuator position, where the first actuator position is a current position of the first actuator 148. In such an example, the first and the second actuators 148, 152 are deactivated while the third through eighth actuators 156, 160, 164, 168, 172, 176 remain operational, not deactivated, etc.

At block 816, the example ASM 100 enables a deactivation failed flag. For example, the alert generator 540 may enable a deactivation failed flag indicating that the first and the fourth flaps 124, 130 are deactivated (e.g., annunciating to a pilot in a cockpit of the aircraft 102 of FIGS. 1-2 that the first and the fourth flaps 124, 130 are deactivated, etc.) while the second and the third flaps 126, 128 remain operational. In another example, the alert generator 540 may enable a deactivation failed flag indicating that the first and the second actuators 148, 152 are deactivated (e.g., annunciating to a pilot in a cockpit of the aircraft 102 of FIGS. 1-2 that the first and the second actuators 148, 152 are deactivated, etc.) while the third through eighth actuators 156, 160, 164, 168, 172, 176 remain operational, not deactivated, etc. In response to the example ASM 100 enabling the deactivation failed flag, the example method 800 concludes.

If, at block 804, the example ASM 100 determines that the second control surface component is non-responsive (e.g., the first control surface component is responsive, while the second control surface component is non-responsive, etc.), then, at block 818, the ASM 100 ceases movement of the first control surface component. For example, the difference calculator 520 may determine that the fourth flap 130 is lagging the first flap 124. In response to determining that the fourth flap 130 is lagging the first flap 124, the example command generator 530 may remove power from the first and the second motors 302, 304 operatively coupled to the first flap 124 via the first and the second actuators 148, 152 to stop the first flap 124 from moving. In another example, the difference calculator 520 may determine that the second actuator 152 is lagging the first actuator 148. In response to determining that the second actuator 152 is lagging the first actuator 148, the example command generator 530 may remove power from the first motor 302 operatively coupled to the first actuator 148 to stop the first actuator 148 from moving.

At block 820, the example ASM 100 moves the second control surface component to a current position of the first control surface component. For example, the command generator 530 may transmit a command to the fourth flap 130 to move to the first flap position, where the first flap position is a current position of the first flap 124. In another example, the command generator 530 may transmit a command to the second actuator 152 to move to the first actuator position, where the first actuator position is a current position of the first actuator 148.

At block 822, the example ASM 100 determines whether the movement was successful. For example, the command generator 530 may determine that the fourth flap 130 did not move to the first flap position within a time window (e.g., within 3 seconds, 30 seconds, 3 minutes, etc.). In some examples, the command generator 530 determines that the fourth flap 130 did not move from the second flap position by comparing a current position of the fourth flap 130 to the second flap position. For example, the command generator 530 may determine that the fourth flap 130 is stuck in the second flap position and unable to move to the first flap position. In another example, the command generator 530 may determine that the second actuator 152 did not move to the first actuator position within a time window (e.g., within 3 seconds, 30 seconds, 3 minutes, etc.). In some examples, the command generator 530 determines that the first actuator 148 did not move from the second actuator position by comparing a current position of the second actuator 152 to the second actuator position. For example, the command generator 530 may determine that the second actuator 152 is stuck in the second actuator position and unable to move to the first actuator position.

If, at block 822, the example ASM 100 determines that the movement was successful, then the example method 800 concludes. For example, the command generator 530 may transmit a command to the first and the fourth flaps 124, 130 to resume normal operation, re-enable the first flap 124 (e.g., the first flap 124 may continue to move based on a command from the ASM 100 via the actuator controller 180 of FIGS. 1 and 3, etc.), etc. In another example, the command generator 530 may transmit a command to the first and the second actuators 148, 152 to resume normal operation, re-enable the first actuator 148 (e.g., the first actuator 148 may continue to move based on a command from the ASM 100 via the actuator controller 180 FIGS. 1 and 3, etc.), etc.

If, at block 822, the example ASM 100 determines that the movement was not successful, then, at block 824, the example ASM 100 ceases movement of the second control surface component. For example, the command generator 530 may remove power from the seventh and the eighth motors 314, 316 operatively coupled to the fourth flap 130 via the seventh and the eighth actuators 172, 176 to stop the fourth flap 130 from moving. In another example, the command generator 530 may remove power from the second motor 304 operatively coupled to the second actuator 152 to stop the second actuator 152 from moving.

At block 826, the example ASM 100 moves the first control surface component to a current position of the second control surface component. For example, the command generator 530 may transmit a command to the first flap 124 to move to the second flap position, where the second flap position is a current position of the fourth flap 130. In such an example, the first and the fourth flaps 124, 130 are deactivated while the second and the third flaps 126, 128 remain operational, not deactivated, etc. In another example, the command generator 530 may transmit a command to the first actuator 148 to move to the second actuator position, where the second actuator position is a current position of the second actuator 152. In such an example, the first and the second actuators 148, 152 are deactivated while the third through eighth actuators 156, 160, 164, 168, 172, 176 remain operational, not deactivated, etc.

In response to the example ASM 100 moving the first control surface component to a current position of the second control surface component, at block 816, the example ASM 100 enables a deactivation failed flag as described above. In response to example ASM 100 enabling the deactivation failed flag, the example method 800 concludes.

Figure 9:
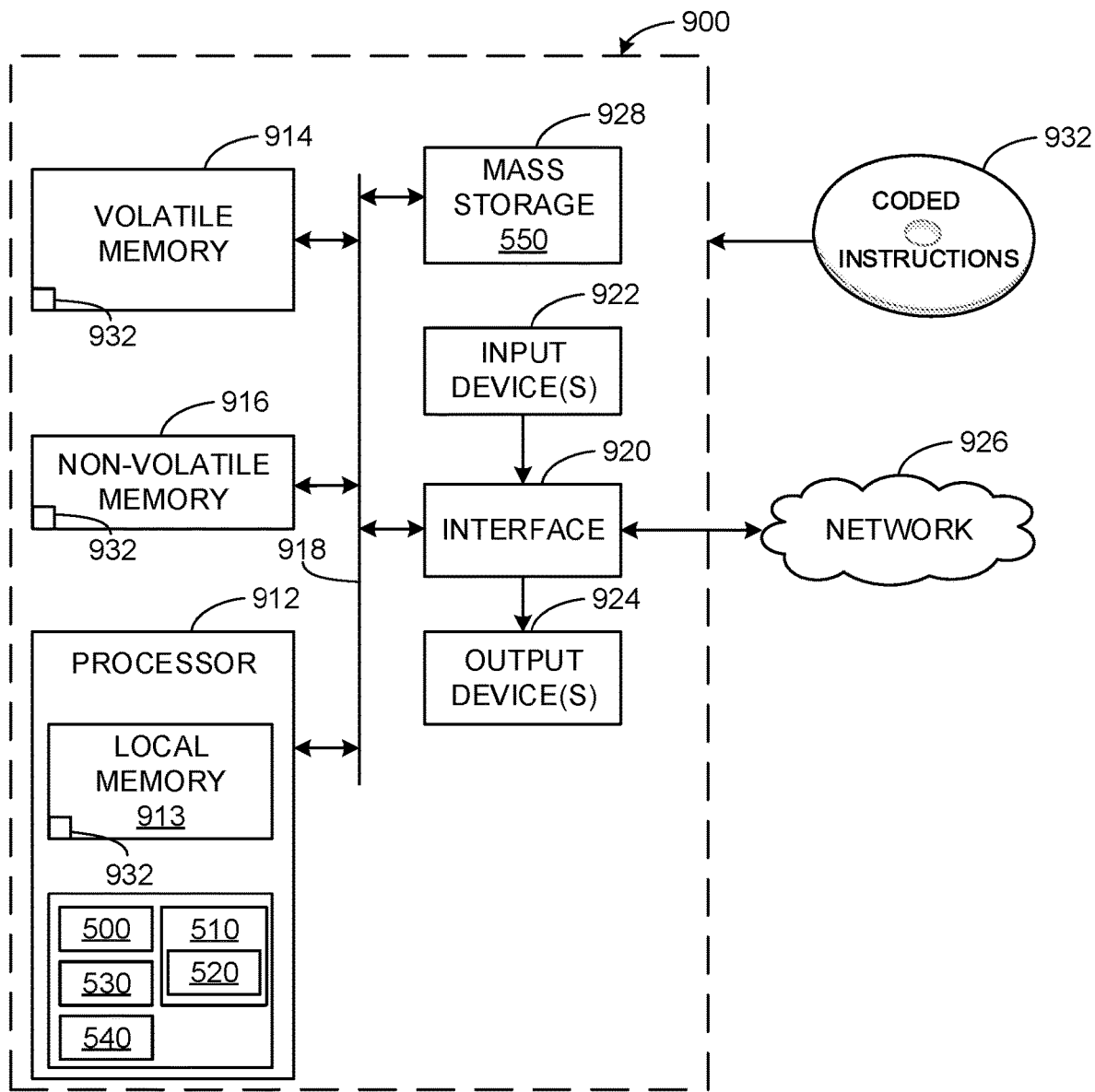
FIG. 9 is a block diagram of an example processing platform structured to execute machine readable instructions to implement the methods of FIGS. 6-8 and/or the example actuator system manager apparatus of FIGS. 1-5.

FIG. 9 is a block diagram of an example processor platform 900 capable of executing instructions to implement the methods of FIGS. 6-8 and the example ASM 100 of FIGS. 1-5. The processor platform 900 can be, for example, a server, an aircraft computer, an industrial computer, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor implements the example collection engine 500, the example non-responsive component detector 510, the example difference calculator 520, the example command generator 530, and the example alert generator 540.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, a position sensor, a skew position sensor, an electric power usage sensor, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, solid-state drives, compact disk drives, Blu-ray disk drives, RAID systems, and digital versatile disk (DVD) drives. The mass storage device 928 implements the example database 550.

Coded instructions 932 to implement the methods of FIGS. 6-8 may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that implement examples of distributed aircraft actuation systems. The example ASM apparatus can monitor the disclosed example distributed aircraft actuation systems to detect non-responsive control surface components. The example ASM apparatus can deactivate a control surface or a set of control surfaces based on a detected non-responsive control surface component, while the remaining control surfaces or the remaining set(s) of control surface components remain activated. The example ASM apparatus can provide pilot flexibility in managing aircraft approach speeds by having one or more control surfaces activated for use while non-responsive control surfaces are deactivated.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    collection engine circuitry to obtain monitoring data associated with a first control surface and a second control surface, the first control surface on a first side of an aircraft, the second control surface on a second side of the aircraft, the first side opposite the second side;
    non-responsive component detector circuitry to:
        determine a first position difference between a first position of the first control surface and a second position of the second control surface based on the monitoring data, the first position to lag the second position; and
        determine a second position difference between a third position of a first actuator of the first control surface and a fourth position of a second actuator of the second control surface; and
    command generator circuitry, after at least one of a first determination that the first position difference satisfies a first threshold or a second determination that the second position difference satisfies a second threshold, the command generator circuitry is to:
        cease movement of the second control surface at the second position;
        attempt to move the first control surface to the second position; and
        cease movement of the first control surface when moved to the second position.

2. The apparatus of claim 1, wherein the command generator circuitry is to, after a third determination that the first control surface is unable to move to the second position, deactivate a first set of control surfaces while a second set of the control surfaces is to remain active, the first set of the control surfaces including the first control surface and the second control surface, the second set different from the first set, the deactivation to include:
    ceasing movement of the first control surface at the first position;
    moving the second control surface to the first position; and
    ceasing movement of the second control surface when moved to the first position.

3. The apparatus of claim 1, wherein the monitoring data is first monitoring data corresponding to a first set of control surfaces, the first set to include the first control surface and the second control surface, and wherein:
    the collection engine circuitry is to obtain second monitoring data, the second monitoring data to correspond to a second set of the control surfaces, the second set to include a third control surface on the first side and a fourth control surface on the second side; and
    the non-responsive component detector circuitry is to determine at least one of the first position difference or the second position difference based on at least one of the first monitoring data or the second monitoring data.

4. The apparatus of claim 1, wherein the first control surface is in a first set of control surfaces and the second control surface is in a second set of the control surfaces, the first control surface to include the first actuator and a third actuator, and wherein:
    the non-responsive component detector circuitry is to:
        determine a skew position difference between the first actuator and the third actuator; and
        compare the skew position difference to a third threshold; and
    the command generator circuitry is to deactivate the first set of the control surfaces while the second set of the control surfaces is to remain active after a third determination that the third threshold is satisfied.

5. The apparatus of claim 1, wherein the first control surface is in a first set of control surfaces and the second control surface is in a second set of the control surfaces, the first control surface to include the first actuator and a third actuator, and wherein:
    the non-responsive component detector circuitry is to:
        determine a force difference between the first actuator and the third actuator;
        compare the force difference to a third threshold; and
    the command generator circuitry is to deactivate the first set of the control surfaces while the second set of the control surfaces is to remain active after a third determination that the third threshold is satisfied.

6. The apparatus of claim 1, wherein the first control surface includes the first actuator and a third actuator, and wherein:
    the non-responsive component detector circuitry is to determine a third position difference between the third position of the first actuator and a fifth position of the third actuator, the third position to lag the fifth position; and
    after a third determination that the third position difference satisfies a third threshold, the command generator circuitry is to:
        cease movement of the third actuator;
        attempt to move the first actuator to the fifth position; and
        cease movement of the first actuator when moved to the fifth position.

7. The apparatus of claim 6, wherein after a fourth determination that the first actuator is unable to move to the fifth position, the command generator circuitry is to:
    cease movement of the first actuator at the third position;
    move the third actuator to the third position; and
    cease movement of the third actuator when moved to the third position.

8. A non-transitory computer readable storage medium comprising instructions that, when executed, cause at least one processor to at least:
    obtain monitoring data associated with a first control surface and a second control surface, the first control surface on a first side of an aircraft, the second control surface on a second side of the aircraft, the first side opposite the second side;
    determine a first position difference between a first position of the first control surface and a second position of the second control surface, the first position to lag the second position;
    determine a second position difference between a third position of a first actuator of the first control surface and a fourth position of a second actuator of the second control surface; and
    after at least one of a first determination that the first position difference satisfies a first threshold or a second determination that the second position difference satisfies a second threshold:
        cease movement of the second control surface at the second position;
        attempt to move the first control surface to the second position; and
        cease movement of the first control surface when moved to the second position.

9. The non-transitory computer readable storage medium of claim 8, wherein the instructions are to cause the at least one processor to, after a third determination that the first control surface is unable to move to the second position, deactivate a first set of control surfaces while a second set of the control surfaces remains active, the first set of the control surfaces to include the first control surface and the second control surface, the second set different from the first set, the deactivation to include:
    ceasing movement of the first control surface at the first position;
    moving the second control surface to the first position; and
    ceasing movement of the second control surface when moved to the first position.

10. The non-transitory computer readable storage medium of claim 8, wherein the monitoring data is first monitoring data corresponding to a first set of control surfaces, the first set to include the first control surface and the second control surface, and the instructions are to cause the at least one processor to:
    obtain second monitoring data, the second monitoring data to correspond to a second set of the control surfaces, the second set to include a third control surface on the first side and a fourth control surface on the second side; and
    determine at least one of the first position difference or the second position difference based on at least one of the first monitoring data or the second monitoring data.

11. The non-transitory computer readable storage medium of claim 8, wherein the first control surface is in a first set of control surfaces and the second control surface is in a second set of the control surfaces, the first control surface to include the first actuator and a third actuator, and the instructions are to cause the at least one processor to:
    determine a skew position difference between the first actuator and the third actuator;
    compare the skew position difference to a third threshold; and
    deactivate the first set of the control surfaces while the second set of the control surfaces is to remain active after a third determination that the third threshold is satisfied.

12. The non-transitory computer readable storage medium of claim 8, wherein the first control surface is in a first set of control surfaces and the second control surface is in a second set of the control surfaces, the first control surface to include the first actuator and a third actuator, and the instructions are to cause the at least one processor to:
    determine a force difference between the first actuator and the third actuator;
    compare the force difference to a third threshold; and
    deactivate the first set of the control surfaces while the second set of the control surfaces is to remain active after a third determination that the third threshold is satisfied.

13. The non-transitory computer readable storage medium of claim 8, wherein the first control surface includes the first actuator and a third actuator, and the instructions are to cause the at least one processor to:
    determine a third position difference between the third position of the first actuator and a fifth position of the third actuator, the third position to lag the fifth position; and
    after a third determination that the second position difference satisfies a third threshold:
    cease movement of the third actuator;
    attempt to move the first actuator to the fifth position; and
    cease movement of the first actuator when moved to the fifth position.

14. The non-transitory computer readable storage medium of claim 13, wherein the instructions are to cause the at least one processor to, after a fourth determination that the first actuator is unable to move to the fifth position:
    cease movement of the first actuator at the third position;
    move the third actuator to the third position; and
    cease movement of the third actuator when moved to the third position.

15. A method comprising:
    obtaining monitoring data associated with a first control surface and a second control surface, the first control surface on a first side of an aircraft, the second control surface on a second side of the aircraft, the first side opposite the second side;
    determining a first position difference between a first position of the first control surface and a second position of the second control surface based on the monitoring data, the first position lagging the second position;
    determining a second position difference between a third position of a first actuator of the first control surface and a fourth position of a second actuator of the second control surface; and
    in response to determining that at least one of the first position difference satisfies a first threshold or the second position difference satisfies a second threshold:
    ceasing movement of the second control surface at the second position;
    attempting to move the first control surface to the second position; and
    ceasing movement of the first control surface when moved to the second position.

16. The method of claim 15, further including, in response to the first control surface being unable to move to the second position, deactivating a first set of control surfaces while a second set of the control surfaces remains active, the first set of the control surfaces including the first control surface and the second control surface, the second set different from the first set, the deactivating including:
  ceasing movement of the first control surface at the first position;
  moving the second control surface to the first position; and
  ceasing movement of the second control surface when moved to the first position.

17. The method of claim 15, wherein the monitoring data is first monitoring data corresponding to a first set of control surfaces, the first set to include the first control surface and the second control surface, and the method further including:
  obtaining second monitoring data, the second monitoring data to correspond to a second set of the control surfaces, the second set including a third control surface on the first side and a fourth control surface on the second side; and
  determining at least one of the first position difference or the second position difference based on at least one of the first monitoring data or the second monitoring data.

18. The method of claim 15, wherein the first control surface is in a first set of control surfaces and the second control surface is in a second set of the control surfaces, the first control surface including the first actuator and a third actuator, and the method further including:
  determining a skew position difference between the first actuator and the third actuator;
  comparing the skew position difference to a third threshold; and
  in response to determining that the third threshold is satisfied, deactivating the first set of the control surfaces while the second set of the control surfaces remains active.

19. The method of claim 15, wherein the first control surface is in a first set of control surfaces and the second control surface is in a second set of the control surfaces, the first control surface including the first actuator and a third actuator, and the method further including:
  determining a force difference between the first actuator and the third actuator;
  comparing the force difference to a third threshold; and
  in response to determining that the third threshold is satisfied, deactivating the first set of the control surfaces while the second set of the control surfaces remains active.

20. The method of claim 15, wherein the first control surface includes the first actuator and a third actuator, and the method further including:
  determining a third position difference between the third position of the first actuator and a fifth position of the third actuator, the third position lagging the fifth position; and
  in response to the third position difference satisfying a third threshold:
  ceasing movement of the third actuator;
  attempting to move the first actuator to the fifth position; and
  ceasing movement of the first actuator when moved to the fifth position.

21. The method of claim 20, further including, in response to the first actuator being unable to move to the fifth position:
  ceasing movement of the first actuator at the third position;
  moving the third actuator to the third position; and
  ceasing movement of the third actuator when moved to the third position.

22. An apparatus comprising:
  at least one memory;
  machine readable instructions; and
  at least one processor to execute the machine readable instructions to at least:
  obtain monitoring data associated with a first control surface on a first side of an aircraft and a second control surface on a second side of the aircraft, the first side opposite the second side;
  determine a first position difference between a first position of the first control surface and a second position of the second control surface based on the monitoring data, the first position to lag the second position;
  determine a second position difference between a third position of a first actuator of the first control surface and a fourth position of a second actuator of the second control surface; and
  after at least one of a first determination that the first position difference satisfies a first threshold or a second determination that the second position difference satisfies a second threshold:
  cease movement of the second control surface at the second position;
  attempt to move the first control surface to the second position; and
  cease movement of the first control surface when moved to the second position.

23. The apparatus of claim 22, wherein the at least one processor is to, after a third determination that the first control surface is unable to move to the second position, deactivate a first set of control surfaces while a second set of the control surfaces is to remain active, the first set of the control surfaces including the first control surface and the second control surface, the second set different from the first set, the deactivation to include:
  ceasing movement of the first control surface at the first position;
  moving the second control surface to the first position; and
  ceasing movement of the second control surface when moved to the first position.

24. The apparatus of claim 22, wherein the monitoring data is first monitoring data corresponding to a first set of control surfaces, the first set to include the first control surface and the second control surface, and the at least one processor is to:
  obtain second monitoring data, the second monitoring data to correspond to a second set of the control surfaces, the second set to include a third control surface on the first side and a fourth control surface on the second side; and
  determine at least one of the first position difference or the second position difference based on at least one of the first monitoring data or the second monitoring data.

25. The apparatus of claim 22, wherein the first control surface is in a first set of control surfaces and the second control surface is in a second set of the control surfaces, the first control surface to include the first actuator and a third actuator, and the at least one processor is to:

determine a skew position difference between the first actuator and the third actuator; and compare the skew position difference to a third threshold; and deactivate the first set of the control surfaces while the second set of the control surfaces is to remain active after a third determination that the third threshold is satisfied.

26. The apparatus of claim 22, wherein the first control surface is in a first set of control surfaces and the second control surface is in a second set of the control surfaces, the first control surface to include the first actuator and a third actuator, and the at least one processor is to:

determine a force difference between the first actuator and the third actuator;

compare the force difference to a third threshold; and deactivate the first set of the control surfaces while the second set of the control surfaces is to remain active after a third determination that the third threshold is satisfied.

27. The apparatus of claim 22, wherein the first control surface includes the first actuator and a third actuator, and the at least one processor is to:

determine a third position difference between the third position of the first actuator and a fifth position of the third actuator, the third position to lag the fifth position; and after a third determination that the third position difference satisfies a third threshold:

cease movement of the third actuator;

attempt to move the first actuator to the fifth position; and cease movement of the first actuator when moved to the fifth position.

28. The apparatus of claim 27, wherein after a fourth determination that the first actuator is unable to move to the fifth position, the at least one processor is to:

cease movement of the first actuator at the third position;

move the third actuator to the third position; and cease movement of the third actuator when moved to the third position.

* * * * *